(12) United States Patent
Dong

(10) Patent No.: US 12,052,488 B2
(45) Date of Patent: Jul. 30, 2024

(54) CAMERA DECORATION COVER AND ELECTRONIC DEVICE

(71) Applicant: HONOR DEVICE CO., LTD., Shenzhen (CN)

(72) Inventor: Xiaoyong Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/908,505

(22) PCT Filed: Apr. 27, 2022

(86) PCT No.: PCT/CN2022/089577
§ 371 (c)(1),
(2) Date: Aug. 31, 2022

(87) PCT Pub. No.: WO2023/000751
PCT Pub. Date: Jan. 26, 2023

(65) Prior Publication Data
US 2024/0196078 A1 Jun. 13, 2024

(30) Foreign Application Priority Data
Jul. 23, 2021 (CN) .......................... 202110838183.4

(51) Int. Cl.
H04N 23/57 (2023.01)
H04M 1/02 (2006.01)
H04N 23/52 (2023.01)

(52) U.S. Cl.
CPC .......... *H04N 23/57* (2023.01); *H04M 1/0283* (2013.01); *H04N 23/52* (2023.01)

(58) Field of Classification Search
CPC ...... H04N 23/57; H04N 23/52; H04M 1/0283
See application file for complete search history.

(56) References Cited

U.S. PATENT DOCUMENTS 7,166,904 B2    1/2007  Gill et al.
7,554,620 B2 *  6/2009  Kim .................... H05K 9/0067
                                                              349/40

(Continued)

FOREIGN PATENT DOCUMENTS

CN    1674253 A    9/2005
CN    2750586 Y    1/2006

(Continued)

*Primary Examiner* — Twyler L Haskins
*Assistant Examiner* — John H Morehead, III
(74) *Attorney, Agent, or Firm* — WOMBLE BOND DICKINSON (US) LLP

(57) ABSTRACT

A camera decoration cover includes a decoration cover plate stacked with a light-transmitting cover plate. A region covered by the light-transmitting cover plate on the decoration cover plate is a coverage region, at least one camera hole is provided in the coverage region, the coverage region includes at least one first region, and the first region is provided with at least one first electrostatic discharge hole corresponding to the camera hole. A center of the coverage region is a first center, and a center of the camera hole is a second center. The first region is a region located on one side of the second center far away from the first center, and the first region is formed by respectively rotating a straight line where the first center and the second center lie around the first center toward two sides of the straight line by a first preset angle.

20 Claims, 20 Drawing Sheets

(56) References Cited

U.S. PATENT DOCUMENTS

2015/0243608 A1* 8/2015 Yang .................. H01P 3/06
                                                    29/828
2015/0366110 A1* 12/2015 Park ................ H05K 9/0067
                                                   348/373

FOREIGN PATENT DOCUMENTS

| | | |
|---|---|---|
| CN | 1870850 A | 11/2006 |
| CN | 1937878 A | 3/2007 |
| CN | 204377279 U | 6/2015 |
| CN | 104882220 A | 9/2015 |
| CN | 105578722 A | 5/2016 |
| CN | 105847648 A | 8/2016 |
| CN | 206100241 U | 4/2017 |
| CN | 107690246 A | 2/2018 |
| CN | 107707794 A | 2/2018 |
| CN | 107808935 A | 3/2018 |
| CN | 207123673 U | 3/2018 |
| CN | 207151020 U | 3/2018 |
| CN | 207965743 U | 10/2018 |
| CN | 113113421 A | 7/2021 |
| EP | 2706827 A1 | 3/2014 |

* cited by examiner

CAMERA DECORATION COVER AND ELECTRONIC DEVICE

CROSS-REFERENCE TO RELATED APPLICATIONS

This application is a National Stage of International Application No. PCT/CN2022/089577, filed on Apr. 27, 2022, which claims priority to Chinese Patent Application No. 202110838183.4, filed on Jul. 23, 2021. Both of the aforementioned applications are hereby incorporated by reference in their entireties.

TECHNICAL FIELD

This application relates to the field of electronic device technologies, and in particular, to a camera decoration cover and an electronic device.

BACKGROUND

The camera module is widely used in an electronic device such as a mobile phone, a notebook computer, or a tablet computer. With the development of electronic device technologies, more components are integrated in the camera module to meet people's photographing requirements for the camera module. As a result, the camera module has a relatively poor capability for resisting electro-static discharge (electro-static discharge, ESD). Therefore, during design of the electronic device, it is necessary to design an electrostatic discharge structure at a position corresponding to the camera hole. However, the existing electrostatic discharge structure has a poor protection effect on the camera module, which needs to be further improved.

SUMMARY

Embodiments of this application provide a camera decoration cover and an electronic device, to improve an electrostatic protection effect of a camera module.

To achieve the foregoing objective, the following technical solutions are used in the embodiments of this application:

According to a first aspect, some embodiments of this application provide a camera decoration cover. The camera decoration cover includes a decoration cover plate and a light-transmitting cover plate that are stacked. A region covered by the light-transmitting cover plate on the decoration cover plate is a coverage region, at least one camera hole is provided in the coverage region, the coverage region includes at least one first region, and the first region is provided with at least one first electrostatic discharge hole corresponding to the camera hole; a center of the coverage region is a first center, and a center of the camera hole is a second center; and the first region is a region formed on one side of the second center far away from the first center by respectively rotating a straight line where the first center and the second center lie around the first center toward two sides of the straight line by a first preset angle, and the first preset angle is in a range of (0, 45°].

According to the camera decoration cover provided in the embodiments of the first aspect of this application, the first region is a region formed on one side of the second center far away from the first center by respectively rotating a straight line where the first center and the second center lie around the first center toward two sides of the straight line by a first preset angle, where the first preset angle is in a range of (0, 45°], and at least one first electrostatic discharge hole corresponding to the camera hole is provided in the first region, so that the first electrostatic discharge hole may be distributed at a position on a periphery of the camera hole close to the outer edge of the coverage region, and static electricity located on an outer side of the electronic device first passes through the first electrostatic discharge hole and then is discharged to the first ground member without being discharged to the camera module through the camera hole. In addition, the first ground member and the camera module are independent of each other, so that at least part of the static electricity located on the outer side of the electronic device may not damage the camera module, thereby improving a protection effect on the camera module.

In an implementation according to the first aspect of this application, the first preset angle is in a range of (0°, 25°]. In this way, the position of the first electrostatic discharge hole may further be optimized, and the electrostatic protection effect on the camera module is improved.

In an implementation according to the first aspect of this application, the coverage region includes a first subregion connected to an outer edge of the coverage region, the first subregion is in the shape of a ring extending fully around a circumferential direction of the coverage region, a distance between an inner edge of the first subregion and the outer edge of the coverage region is in a range of (0, 10 mm], and the at least one first electrostatic discharge hole is located in the first subregion. With such configuration, the position of the first electrostatic discharge hole may further be optimized, thereby further improving the electrostatic protection effect on the camera module.

In an implementation according to the first aspect of this application, the at least one first electrostatic discharge hole intersects with the straight line. With such configuration, an electrostatic discharge path may be shortened, thereby facilitating timely discharge of static electricity.

In an implementation according to the first aspect of this application, the first electrostatic discharge holes are respectively provided on two sides of the straight line. Such configuration is beneficial to arrange the first electrostatic discharge hole according to the position of the camera module and the layout of the first ground member inside the electronic device, thereby improving rationality of the structural layout.

In an implementation according to the first aspect of this application, the first electrostatic discharge hole is an elongated hole, and the first electrostatic discharge hole extends in the circumferential direction of the coverage region. With such configuration, more regions of the camera hole may be surrounded by the first electrostatic discharge hole in the circumferential direction of the coverage region, so that it is further ensured that static electricity can be discharged to the first ground member through the first electrostatic discharge hole in time, thereby improving the electrostatic protection effect on the camera module.

In an implementation according to the first aspect of this application, the camera decoration cover includes: an adhesive layer, where the adhesive layer is located in the coverage region and is connected between the decoration cover plate and the light-transmitting cover plate, the adhesive layer is in the shape of a ring extending fully around the circumferential direction of the coverage region, and the camera hole and the first electrostatic discharge hole are located on an inner peripheral side of the adhesive layer.

In an implementation according to the first aspect of this application, a protruding adhesive layer portion is arranged on an inner edge of the adhesive layer, and the protruding adhesive layer portion protrudes toward the camera hole and is located in the first region. The adhesive layer has a certain anti-static effect, and the arrangement of the protruding adhesive layer portion may widen the width of the adhesive layer on the protruding adhesive layer portion, thereby improving the anti-static effect on the camera module.

In an implementation according to the first aspect of this application, each camera hole corresponds to a plurality of first electrostatic discharge holes, and the protruding adhesive layer portion is provided with the first electrostatic discharge holes respectively on two sides of the circumferential direction of the coverage region. With such configuration, the anti-static effect on the camera module may further be improved.

In an implementation according to the first aspect of this application, the coverage region is a ring extending in a circumferential direction of the decoration cover plate, and the coverage region includes at least one second region; and the second region is provided with at least one second electrostatic discharge hole corresponding to the camera hole, the second region is a region formed on one side of the second center adjacent to the first center by respectively rotating the straight line where the first center and the second center lie around the second center toward the two sides of the straight line by a second preset angle, and the second preset angle is in a range of (0, 45°]. In this way, the second electrostatic discharge hole may be distributed at a position on a periphery of the camera hole adjacent to an inner edge of the coverage region, and static electricity located on an outer side of the electronic device first passes through the second electrostatic discharge hole and then is discharged to the second ground member without being discharged to the camera module through the camera hole In addition, the second ground member and the camera module are independent of each other, so that at least part of the static electricity located on the outer side of the electronic device may not damage the camera module, thereby improving the protection effect on the camera module.

According to a second aspect, this application further provides a camera decoration cover, including a decoration cover plate and a light-transmitting cover plate that are stacked. A region covered by the light-transmitting cover plate on the decoration cover plate is a coverage region, the coverage region is a ring extending in a circumferential direction of the decoration cover plate, at least one camera hole is provided in the coverage region, the coverage region includes at least one second region, and the second region is provided with at least one second electrostatic discharge hole corresponding to the camera hole; a center of the coverage region is a first center, and a center of the camera hole is a second center; and the second region is a region formed on one side of the second center adjacent to the first center by respectively rotating a straight line where the first center and the second center lie around the second center toward two sides of the straight line by a second preset angle, and the second preset angle is in a range of (0, 45°].

According to the camera decoration cover provided in the embodiments of the second aspect of this application, the second region is a region formed on one side of the second center adjacent to the first center by respectively deflecting the straight line where the first center and the second center lie around the second center toward the two sides of the straight line by a second preset angle, the second preset angle is in a range of (0, 45°], and the second region is provided with at least one second electrostatic discharge hole. In this way, the at least one second electrostatic discharge hole corresponding to the camera hole may be distributed at a position on a periphery of the camera hole adjacent to the inner edge of the coverage region, and static electricity located on an outer side of the electronic device first passes through the second electrostatic discharge hole and then is discharged to the second ground member without being discharged to the camera module through the camera hole. In addition, the second ground member and the camera module are independent of each other, so that at least part of the static electricity located on the outer side of the electronic device may not damage the camera module, thereby improving the protection effect on the camera module.

In an implementation according to the second aspect of this application, the second preset angle is in a range of (0, 25°]. In this way, the position of the second electrostatic discharge hole may further be optimized, and the electrostatic protection effect on the camera module is improved.

In an implementation according to the second aspect of this application, the coverage region includes a second subregion connected to an inner edge of the coverage region, the second subregion extends in an entire circumferential direction of the coverage region, a distance between an outer edge of the second subregion and the inner edge of the coverage region is in a range of (0, 10 mm), and the at least one second electrostatic discharge hole is located in the second subregion. In this way, the position of the second electrostatic discharge hole may further be optimized, and the electrostatic protection effect on the camera module is improved.

In an implementation according to the second aspect of this application, the at least one second electrostatic discharge hole intersects with the straight line. With such configuration, the electrostatic discharge path may be shortened, thereby facilitating timely discharge of static electricity.

In an implementation according to the second aspect of this application, the second electrostatic discharge holes are respectively provided on two sides of the straight line. Such configuration is beneficial to arrange the second electrostatic discharge hole according to the position of the camera module and the layout of the second ground member inside the electronic device, thereby improving rationality of the structural layout.

In an implementation according to the second aspect of this application, the second electrostatic discharge hole is an elongated hole, and the second electrostatic discharge hole extends in the circumferential direction of the coverage region. With such configuration, more regions of the camera hole may be surrounded by the second electrostatic discharge hole in the circumferential direction of the coverage region, so that it is further ensured that static electricity can be discharged to the second ground member through the second electrostatic discharge hole in time, thereby improving the electrostatic protection effect on the camera module.

According to a third aspect, this application further provides an electronic device. The electronic device includes: a rear cover, a camera decoration cover, a camera module, and a first ground member. The rear cover includes a mounting opening, the camera decoration cover is relatively fixed to the rear cover, the camera hole is opposite to the mounting opening, the camera module is located on one side of the decoration cover plate far away from the light-transmitting cover plate, a light-incident surface of the camera module is right opposite to the camera hole, the first ground member is grounded, and the first ground member and the camera module are independent of each other.

Since the electronic device provided in the embodiments of this application includes the camera decoration cover described in any technical solution described above, both technical solutions can resolve the same technical problems and achieve the same technical effect.

In an implementation according to the third aspect of this application, the at least one first electrostatic discharge hole is located on an outer side of an orthographic projection of the corresponding camera module in the coverage region. With such configuration, the first electrostatic discharge hole may be provided to be farther from the camera module, so that the position of the first electrostatic discharge hole is further optimized, thereby improving the electrostatic protection effect on the camera module.

In an implementation according to the third aspect of this application, the camera decoration cover is covered on the mounting opening, the camera decoration cover is located on one side of the rear cover far away from the camera module, a first via hole is provided on a portion of the rear cover corresponding to the coverage region, an orthographic projection of the first via hole in the coverage region overlaps the first electrostatic discharge hole, and static electricity introduced by the first electrostatic discharge hole is guided to the first ground member through the first via hole. With such configuration, the electrostatic discharge path may be shortened, thereby facilitating timely discharge of static electricity to the first ground member through the first electrostatic discharge hole and the first via hole.

In an implementation according to the third aspect of this application, the electronic device includes: a main circuit board and a mainboard bracket, where the main circuit board is located on one side of the rear cover adjacent to the camera module and is electrically connected to the camera module, the mainboard bracket is located on one side of the main circuit board adjacent to the rear cover, the mainboard bracket is provided with an avoidance hole right opposite to the camera hole, and the mainboard bracket is covered on the camera module.

In an implementation according to the third aspect of this application, the mainboard bracket is provided with a second via hole spaced apart from the avoidance hole, and the static electricity introduced by the first electrostatic discharge hole is guided to the first ground member through the second via hole.

In an implementation according to the third aspect of this application, the orthographic projection of the first via hole in the coverage region overlaps the orthographic projection of the second via hole in the coverage region. With such configuration, the first via hole may be in communication with the second via hole, so that the electrostatic discharge path is shortened, thereby facilitating timely discharge of static electricity to the first ground member through the electrostatic discharge path including the first electrostatic discharge hole, the first via hole, and the second via hole.

In an implementation according to the third aspect of this application, orthographic projections of the first electrostatic discharge hole and the first via hole in the coverage region, the orthographic projection of the second via hole in the coverage region, and an orthographic projection of the first ground member in the coverage region are all overlapped. Therefore, the electrostatic discharge path may be significantly shortened.

In an implementation according to the third aspect of this application, the orthographic projection of the second via hole in the coverage region overlaps the first electrostatic discharge hole. With such configuration, the electrostatic discharge path may be shortened, thereby facilitating timely discharge of static electricity to the first ground member through the first electrostatic discharge hole and the second via hole.

In an implementation according to the third aspect of this application, the orthographic projections of the first electrostatic discharge hole and the second via hole in the coverage region and the orthographic projection of the first ground member in the coverage region are all overlapped. Therefore, the electrostatic discharge path may be significantly shortened.

In an implementation according to the third aspect of this application, one end of the first ground member is mounted on one side of the main circuit board facing the camera decoration cover, and the other end of the first ground member extends toward the camera decoration cover and passes through the second via hole.

In an implementation according to the third aspect of this application, the first ground member is a shielding cover mounted on the main circuit board.

In an implementation according to the third aspect of this application, a portion of the mainboard bracket adjacent to the at least one first electrostatic discharge hole is constructed as the first ground member.

According to a fourth aspect, this application further provides an electronic device. The electronic device includes: a rear cover, a camera decoration cover, a camera module, and a second ground member. The rear cover includes a mounting opening, the camera decoration cover is relatively fixed to the rear cover, and the camera hole is opposite to the mounting opening. The camera decoration cover is any one of the foregoing camera decoration covers including the second electrostatic discharge hole, the camera module is located on one side of the decoration cover plate far away from the light-transmitting cover plate, a light-incident surface of the camera module is right opposite to the camera hole, the second ground member is grounded, and the second ground member and the camera module are independent of each other.

Since the electronic device provided in the embodiments of this application includes the camera decoration cover described in any technical solution described above, both technical solutions can resolve the same technical problems and achieve the same technical effect.

In an implementation according to the fourth aspect of this application, the at least one second electrostatic discharge hole is located on an outer side of an orthographic projection of the camera module in the coverage region.

In an implementation according to the fourth aspect of this application, a first communication hole is provided on a portion of the rear cover corresponding to the coverage region, an orthographic projection of the first communication hole in the coverage region overlaps the second electrostatic discharge hole, and static electricity introduced by the second electrostatic discharge hole is guided to the second ground member through the first communication hole.

In an implementation according to the fourth aspect of this application, the electronic device includes: a main circuit board and a mainboard bracket, where the main circuit board is located on one side of the rear cover adjacent to the camera module and is electrically connected to the camera module, the mainboard bracket is located on one side of the main circuit board adjacent to the rear cover, the mainboard bracket is provided with an avoidance hole right opposite to the camera hole, and the mainboard bracket is covered on the camera module.

In an implementation according to the fourth aspect of this application, the mainboard bracket is provided with a second communication hole spaced apart from the avoidance hole, the orthographic projection of the first communication hole in the coverage region overlaps an orthographic projection of the second communication hole in the coverage region.

In an implementation according to the fourth aspect of this application, one end of the second ground member is mounted on the main circuit board, and the other end of the second ground member extends toward the camera decoration cover and passes through the second via hole.

In an implementation according to the fourth aspect of this application, the second ground member is a shielding cover mounted on the main circuit board.

In an implementation according to the fourth aspect of this application, one part of the mainboard bracket adjacent to the second electrostatic discharge hole is constructed as the second ground member.

BRIEF DESCRIPTION OF DRAWINGS

FIG. 8 is a schematic structural diagram of the decoration cover plate shown in FIG. 7a;

FIG. 9 is a schematic structural diagram of the decoration cover plate shown in FIG. 7a;

FIG. 16 is a schematic structural diagram of the decoration cover plate shown in FIG. 15a;

FIG. 17 is a schematic structural diagram of the decoration cover plate shown in FIG. 15a;

DESCRIPTION OF EMBODIMENTS

In the embodiments of this application, the terms "first", "second", "third", and "fourth" are used merely for the purpose of description, and should not be construed as indicating or implying relative importance or implying a quantity of indicated technical features. Therefore, a feature defining "first", "second", "third", or "fourth" may explicitly or implicitly include one or more features.

In the embodiments of this application, the terms "include", "comprise", or any other variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Unless otherwise specified, elements defined by the sentence "including one" does not exclude that there are still other same elements in the processes, methods, objects, or apparatuses.

In the embodiments of this application, the term "and/or" describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

This application provides an electronic device 100. The electronic device 100 is an electronic device having a photographing function. Specifically, The electronic device 100 may be a portable electronic apparatus or another suitable electronic apparatus. For example, the electronic device 100 may be a mobile phone, a tablet personal computer (tablet personal computer), a laptop computer (laptop computer), a personal digital assistant (personal digital assistant, PDA), a camera, a personal computer, a notebook computer, an in-vehicle device, a wearable device, augmented reality (augmented reality, AR) glasses, an AR helmet, virtual reality (virtual reality, VR) glasses, a VR helmet, or the like.

Figure 1:
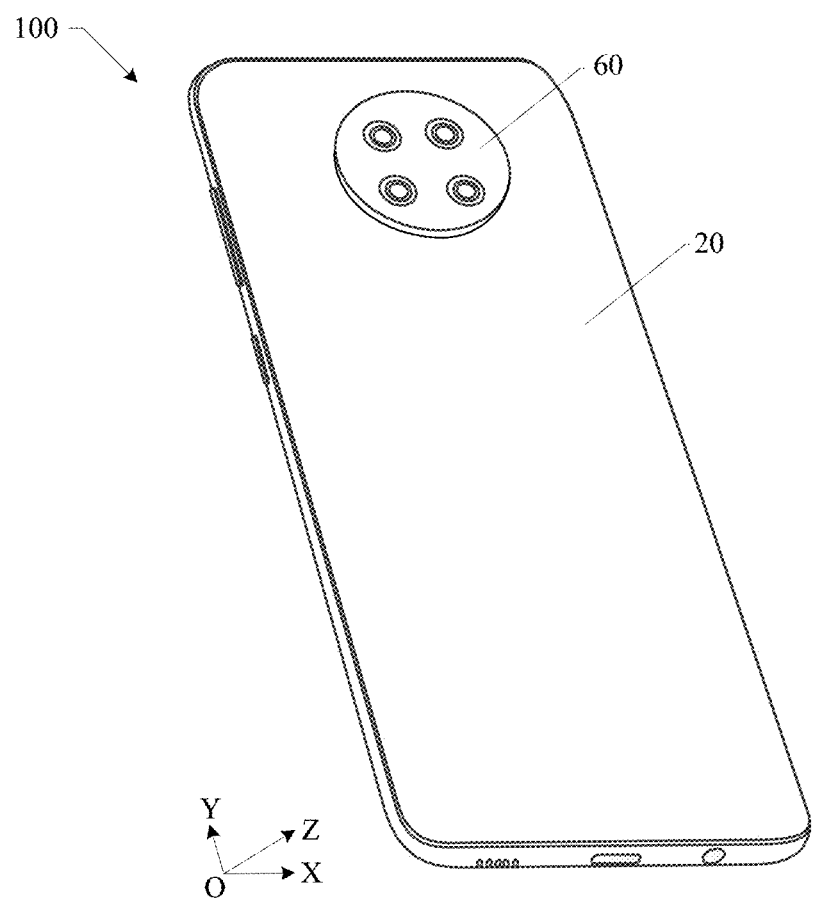
FIG. 1 is a schematic structural diagram of an electronic device according to some embodiments of this application.
Figure 2:
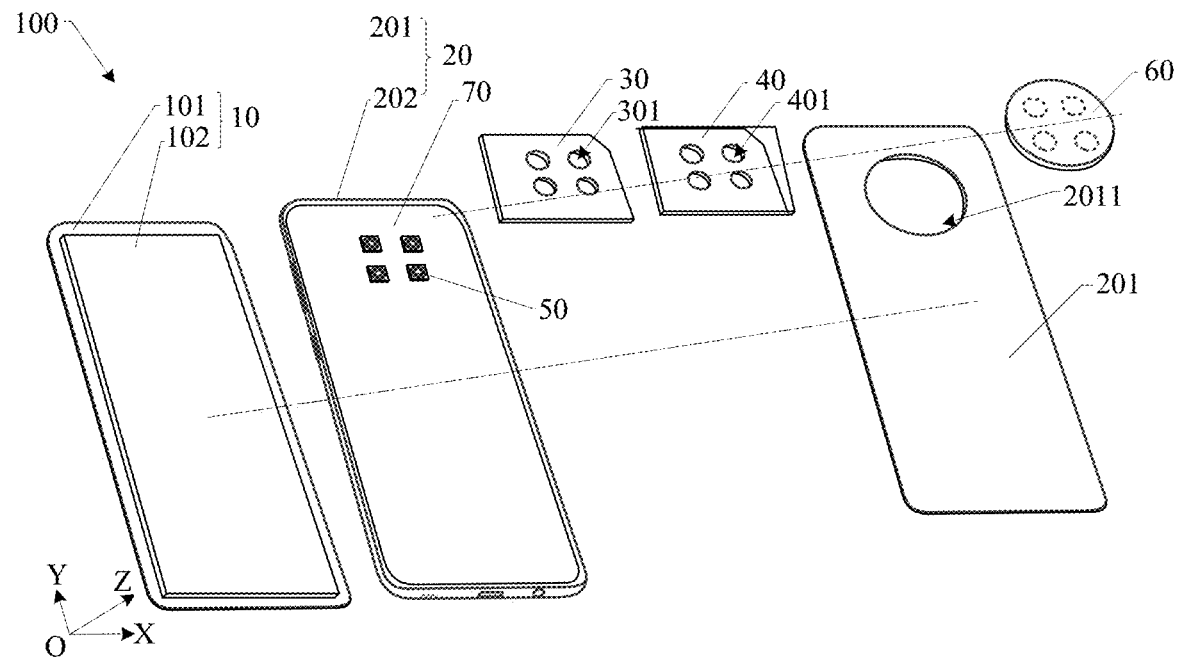
FIG. 2 is an exploded view of the electronic device shown in FIG. 1.

Referring to FIG. 1 and FIG. 2, FIG. 1 is a schematic structural diagram of an electronic device 100 according to some embodiments of this application, and FIG. 2 is an exploded view of the electronic device 100 shown in FIG. 1. In this embodiment, the electronic device 100 is a mobile phone. The electronic device 100 includes a screen 10, a back housing 20, a main circuit board 30, a mainboard bracket 40, a camera module 50, and a camera decoration cover 60.

It may be understood that, FIG. 1 and FIG. 2 schematically show merely some components included in the electronic device 100, and actual shapes, sizes, positions, and structures of such components are not limited by FIG. 1 and FIG. 2. In some other examples, the electronic device 100 may not include the screen 10 and/or the mainboard bracket 40.

The screen 10 is configured to display an image, a video, and the like. The screen 10 includes a light-transmitting plate 101 and a display screen 102. The light-transmitting plate 101 and the display screen 102 are stacked and fixedly connected. The light-transmitting plate 101 is mainly configured to provide a protection and dustproof function for the display screen 102. The material of the light-transmitting plate 101 includes but is not limited to glass, ceramic, or plastic. The display screen 102 may be a flexible display screen, or may be a rigid display screen. For example, the display screen 102 may be an organic light-emitting diode (organic light-emitting diode, OLED) display screen, an active-matrix organic light-emitting diode (active-matrix organic light-emitting diode, AMOLED) display screen, a mini organic light-emitting diode (mini organic light-emitting diode) display screen, a micro organic light-emitting diode (micro organic light-emitting diode) display screen, a micro organic light-emitting diode (micro organic light-emitting diode) display screen, a quantum dot light emitting diodes (quantum dot light emitting diodes, QLED) display screen, or a liquid crystal display (liquid crystal display, LCD) display screen.

The back housing 20 is configured to protect electronic components inside the electronic device 100. The back housing 20 includes a rear cover 201 and a frame 202. The rear cover 201 is located on one side of the display screen 102 far away from the light-transmitting plate 101, and the light-transmitting plate 101, the display screen 102, and the rear cover 201 are stacked. The frame 202 is located between the rear cover 201 and the light-transmitting plate 101. The frame 202 is fixed to the rear cover 201. Exemplarily, the frame 202 may be fixedly connected to the rear cover 201 in a manner such as adhesion, welding, or snap-fit. The frame 202 and the rear cover 201 may be integrally formed, that is, the frame 202 and the rear cover 201 are formed as a whole. The light-transmitting plate 101 may be fixed to the frame 202 in a manner of adhesion. The light-transmitting plate 101, the rear cover 201, and the frame 202 form an internal accommodation space of the electronic device 100. The display screen 102 is accommodated in the internal accommodation space.

For ease of the following description, a stacking direction of the light-transmitting plate 101, the display screen 102, and the rear cover 201 in the electronic device 100 is defined as a Z-axis direction, and the Z-axis direction may also be referred to as a thickness direction of the electronic device. A plane parallel to the light-transmitting plate 101, the display screen 102, and the rear cover 201 is an XY plane. It may be understood that, a coordinate system of the electronic device 100 may be flexibly set according to specific actual requirements. This is not specifically limited herein. In addition, a direction from the rear cover 201 to the display screen 102 is a forward direction, and a direction from the display screen 102 to the rear cover 201 is a backward direction.

The main circuit board 30 is fixed in the internal accommodation space of the electronic device 100. Exemplarily, the main circuit board 30 may be fixed to the display screen 102 in a manner such as threaded connection or snap-fit. Specifically, The main circuit board 30 may be fixed to a surface of the display screen 102 facing the rear cover 201. In other embodiments, referring to FIG. 2, the electronic device 100 further includes a middle plate 70. The middle plate 70 is fixed to a circumference of an inner surface of the frame 202. Exemplarily, the middle plate 70 may be fixed to the frame 202 in a manner of welding, snap-fit, or adhesion. The middle plate 70 and the frame 202 may also be integrally formed. The middle plate 70 is used as a structural "skeleton" of the electronic device 100, and the main circuit board 30 may be fixed to the middle plate 70 in a manner such as threaded connection, snap-fit, or welding. Specifically, The main circuit board 30 may be fixed to one side of the middle plate 70 facing the rear cover 201.

The main circuit board 30 may be a rigid circuit board, or a flexible circuit board, or may be a rigid-flex circuit board. For example, the main circuit board 30 may be an FR-4 dielectric plate, or a Rogers (Rogers) dielectric plate, or may be a hybrid FR-4 and Rogers dielectric plate, or the like. FR-4 is a code name of a flame-resistant material grade, and the Rogers dielectric plate is a high-frequency plate.

The mainboard bracket 40 is located on one side of the main circuit board 30 facing the rear cover 201, and the mainboard bracket 40 is configured to cover electronic components on the main circuit board 30. The mainboard bracket 40 is relatively fixed to the main circuit board 30. Specifically, The mainboard bracket 40 may be fixed to the main circuit board 30 in a manner such as threaded connection, snap-fit, or adhesion, or may be fixed to the middle plate 70 in a manner such as threaded connection, snap-fit, or adhesion. Certainly, the main circuit board 30 may also be fixed to the display screen 102, and the mainboard bracket 40 is fixed to the display screen 102 in a manner such as threaded connection, snap-fit, or adhesion. Specifically, The mainboard bracket 40 may be fixed to the surface of the display screen 102 facing the rear cover 201. In this way, the main circuit board 30 may be connected to the display screen 102 by using the mainboard bracket 40. The material of the mainboard bracket 40 includes but is not limited to plastic, metal, or a combination of plastic and metal.

The camera module 50 is configured to capture photos/record videos. The camera module 50 may be a camera module having at least one of the following functions: adjusting a light entering amount, automatic focusing (automatic focusing, AF), or optical image stabilization (optical image stabilization, OIS). Exemplarily, the camera module 50 may be an automatic focusing camera module 50. The camera module 50 may also be a camera module that does not have functions such as adjusting a light entering amount, automatic focusing (automatic focusing, AF), and optical image stabilization (optical image stabilization, OIS). Exemplarily, the camera module 50 may be a fixed-focus camera module. The fixed-focus camera module includes but is not limited to a wide-angle camera module or a macro camera module.

In some embodiments, the camera module 50 is used as a rear camera module of the electronic device 100. The camera module 50 may include one camera, or may include an array including a plurality of cameras.

The camera module 50 is fixed in the internal accommodation space of the electronic device 100. Exemplarily, the camera module 50 may be fixed to the display screen 102 in a manner such as threaded connection, snap-fit, or welding. Specifically, The camera module 50 may be fixed to the surface of the display screen 102 facing the rear cover 201, and a light-incident surface 5021 of the camera module 50 faces the rear cover 201. In some other embodiments, referring to FIG. 2, in a case that the electronic device 100 further includes the middle plate 70, the camera module 50 may be fixed to the middle plate 70 in a manner such as threaded connection, snap-fit, or welding. Specifically, The camera module 50 may be fixed to the surface of the middle plate 70 facing the rear cover 201. In still other embodiments, the camera module 50 may be fixed to a surface of the main circuit board 30 facing the rear cover 201.

At least part of the camera module 50 may be located between the main circuit board 30 and the mainboard bracket 40, the mainboard bracket 40 is covered on the camera module 50, and the mainboard bracket 40 is provided with an avoidance hole 401 corresponding to the camera module 50, to help the camera module 50 receive a light ray.

Specifically, An avoidance through hole 301 is provided on the main circuit board 30 at a position corresponding to the camera module 50, and an end of the camera module 50 far away from the rear cover 201 is located in the avoidance through hole 301 of the main circuit board 30. In this way, the camera module 50 and the main circuit board 30 have an overlapping region in the Z-axis direction, to prevent the camera module 50 from being stacked on the main circuit board 30 to increase a thickness of the electronic device 100 in the Z-axis direction.

In addition, the camera module 50 is electrically connected to the main circuit board 30. In this way, the camera module 50 may receive signals from the main circuit board 30, and may also transmit signals to the main circuit board 30.

Figure 3:
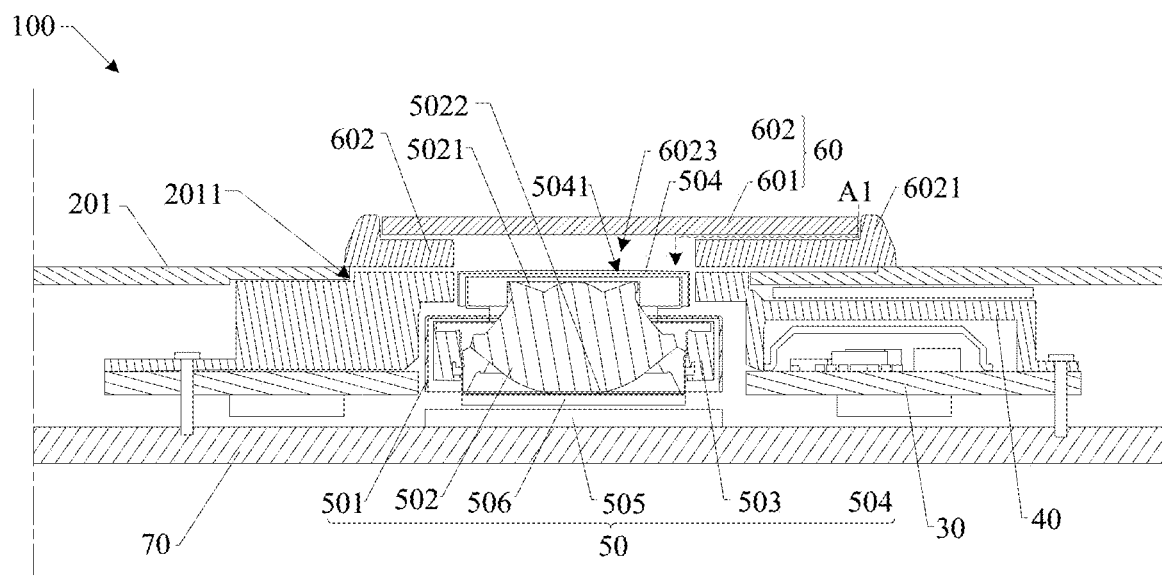
FIG. 3 is a schematic cross-sectional view of a partial structure of the electronic device shown in FIG. 1 and FIG. 2.

Referring to FIG. 3, FIG. 3 is a schematic cross-sectional view of a partial structure of the electronic device 100 shown in FIG. 1 and FIG. 2. In this embodiment, The camera module 50 includes: a housing 501, an optical lens 502, a driving motor 503, a variable aperture 504, a circuit board 505, and an image sensor 506.

The housing 501 is configured to connect the optical lens 502, the driving motor 503, the variable aperture 504, the circuit board 505, and the image sensor 506 as a whole, and fix the whole in the internal accommodation space of the electronic device 100. The material of the housing 501 includes but is not limited to plastic, metal, or a combination of plastic and metal. Exemplarily, the material of the housing 501 includes but is not limited to aluminum alloy or magnesium-aluminum alloy.

The optical lens 502 is located in the housing 501. Specifically, the optical lens 502 includes an optical lens set and a lens barrel, where the optical lens set includes at least one optical lens. In a case that the optical lens set includes a plurality of optical lenses, the plurality of optical lenses are stacked in an optical-axis direction. The lens barrel is configured to fix and protect the optical lens set. The lens barrel has a cylindrical structure. That is, both ends of the lens barrel are open in the optical-axis direction. The optical lens set is mounted in the lens barrel. In some examples, the optical lens set is mounted in the driving motor 503 in the housing 501 by using the lens barrel. In some other embodiments, the optical lens may not include the lens barrel, and the driving motor 503 and the optical lens set are integrated, which can reduce the volume of the camera module 50. The optical lens 502 having different features such as wide-angle, standard, and telephoto may be obtained by designing the structural composition of the optical lens set and the shape and size of each optical lens.

The optical lens 502 includes a light-incident surface 5021 and a light exit surface 5022. During use of the optical lens 502, a light ray is emitted into the optical lens 502 through the light-incident surface 5021 and is emitted out through the light exit surface 5022.

Specifically, Still referring to FIG. 3, the camera module 50 is a vertical camera module, and the optical lens 502 is a vertical lens. An optical axis of the vertical lens extends in the Z-axis direction, the light-incident surface 5021 of the optical lens 502 faces a photographed scenery, and the light exit surface 5022 of the optical lens 502 faces away from the photographed scenery. In other embodiments, the camera module 50 is a periscopic camera module. An optical lens 502 of the periscopic camera module is a periscopic lens, and an optical axis of the periscopic lens is parallel to the XY plane. It is to be noted that, The following embodiments are described by using an example in which the camera module 50 is the periscopic camera module, but this cannot be construed as a particular limitation on this application.

The driving motor 503 is configured to drive the optical lens 502 to move, to achieve automatic focusing and/or optical image stabilization. Specifically, The driving motor 503 may only be configured to drive the optical lens 502 to move in the Z-axis direction, to achieve automatic focusing. Alternatively, the driving motor 503 may only be configured to drive the optical lens 502 to move on the XY plane or tilt in any direction around the optical axis of the optical lens 502, to achieve optical image stabilization. In addition, the driving motor 503 may be configured to achieve both automatic focusing and optical image stabilization.

Still referring to FIG. 3, the variable aperture 504 is located on one side of the light-incident surface 5021 of the optical lens 502. The variable aperture 504 includes an aperture hole 5041, where the aperture hole 5041 is opposite to the light-incident surface 5021 of the optical lens 502. A light ray is emitted into the optical lens 502 through the aperture hole 5041. The size of the aperture hole 5041 is changeable to adjust the light entering amount of the optical lens 502.

The image sensor 506 is located on a light emitting side of the optical lens 502, and a light sensing surface of the image sensor 506 is opposite to the light exit surface 5022 of the optical lens 502. The image sensor 506 is configured to collect light rays emitted through the optical lens 502 and convert image information carried by the light rays into an electrical signal. The image sensor 506 is electrically connected to the circuit board 505, and the image sensor 506 may transmit the electrical signal to the main circuit board 30 through the circuit board 505.

The circuit board 505 is located on one side of the housing 501 far away from the mounting opening 2011, the circuit board 505 may be fixed to the driving motor 503, and the image sensor 506 may be arranged on one side of the circuit board 505 facing the optical lens 502. Exemplarily, the circuit board 505 may be fixed to the driving motor 503 in a manner such as snap-fit, threaded connection, or adhesion.

The circuit board 505 may be a rigid circuit board, or a flexible circuit board, or may be a rigid-flex circuit board. For example, the circuit board 505 may be an FR-4 dielectric plate, or a Rogers (Rogers) dielectric plate, or may be a hybrid FR-4 and Rogers dielectric plate, or the like. FR-4 is a code name of a flame-resistant material grade, and the Rogers dielectric plate is a high-frequency plate.

Still referring to FIG. 3, the mounting opening 2011 is provided on the rear cover 201 at a position corresponding to the camera module 50. There may be one mounting opening 2011, or there may be a plurality of mounting openings 2011. In some examples, all camera modules 50 correspond to one mounting opening 2011. In some other examples, the camera module 50 and the mounting opening 2011 have the same quantity and are in a one-to-one correspondence.

The camera decoration cover 60 is relatively fixed to the rear cover 201. The camera decoration cover 60 corresponds to the mounting opening 2011 and protects the camera module 50.

Figure 4:
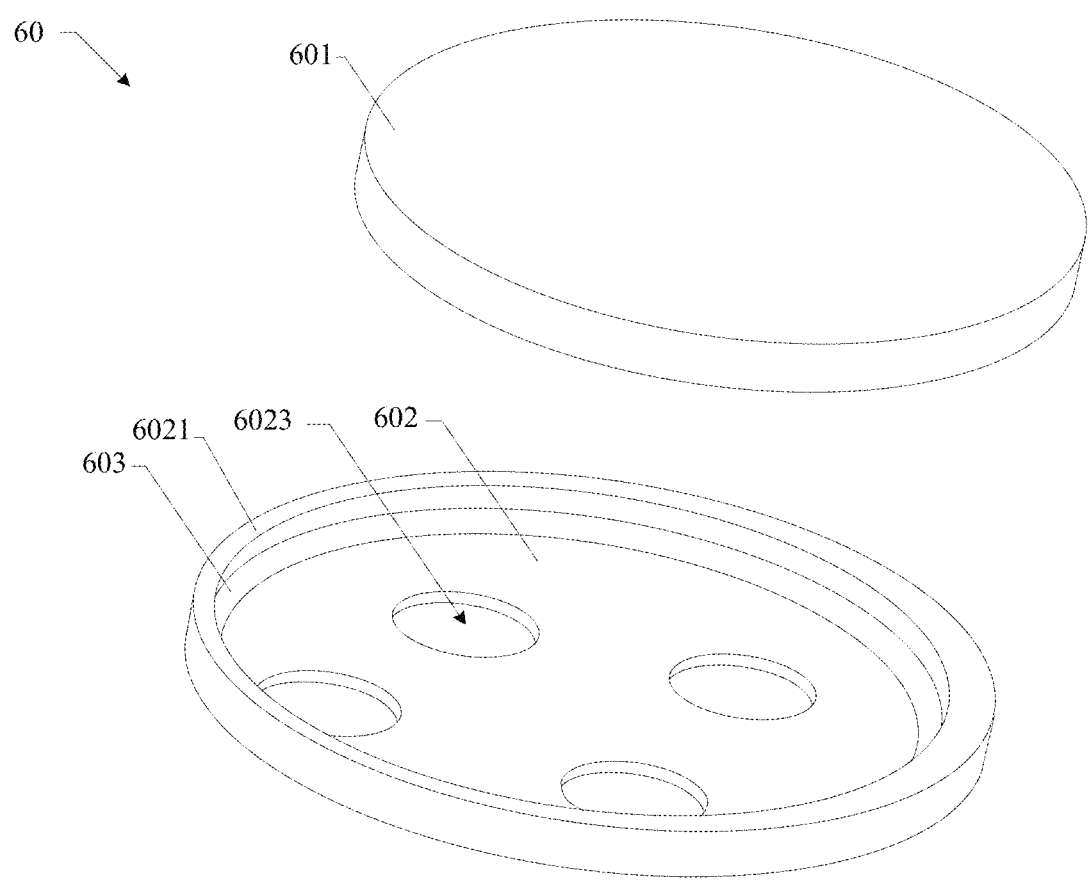
FIG. 4 is an exploded view of a camera decoration cover of the electronic device shown in FIG. 1 to FIG. 3.

Referring to FIG. 4, FIG. 4 is an exploded view of a camera decoration cover 60 of the electronic device 100 shown in FIG. 1 to FIG. 3. In this embodiment, The camera decoration cover 60 includes a light-transmitting cover plate 601, a decoration cover plate 602, and an adhesive layer 603.

The decoration cover plate 602 is arranged on the rear cover 201. In some examples, the decoration cover plate 602 may be mounted on one side of the rear cover 201 far away from the light-transmitting plate 101 and cover the mounting opening 2011. In some other examples, the decoration cover plate 602 may be located in the mounting opening 2011. In other examples, the decoration cover plate 602 is located at an end of the mounting opening 2011 adjacent to the camera module 50 and covers the mounting opening 2011. The connection manner between the decoration cover plate 602 and the rear cover 201 includes but is not limited to adhesion, snap-fit, welding, or screw connection.

Optionally, A sealing member (not shown in the figure) is arranged between the decoration cover plate 602 and the rear cover 201. Based on the arrangement of the sealing member, sealing performance between the decoration cover plate 602 and the rear cover 201 may be improved. The sealing member includes but is not limited to a sealant, a rubber sealing ring, a silicone sealing ring, or the like. Further, A sealing groove (not shown in the figure) configured to accommodate the sealing member may also be provided on one of the decoration cover plate 602 or the rear cover 201.

The decoration cover plate 602 is provided with a camera hole 6023, and there may be one or more camera holes 6023. The camera hole 6023 corresponds to the mounting opening 2011. In some examples, in a case that there are a plurality of camera holes 6023, all camera holes 6023 correspond to one mounting opening 2011. In some other examples, the camera hole 6023 and the mounting opening 2011 have the same quantity and are in a one-to-one correspondence.

The camera hole 6023 and the camera module 50 have the same quantity and are in a one-to-one correspondence. The camera hole 6023 is right opposite to the corresponding camera module 50, and the light ray is allowed by the camera hole 6023 to be emitted into the light-incident surface 5021 of the optical lens 502. In other embodiments, one camera hole 6023 corresponds to a plurality of camera modules 50.

The material of the decoration cover plate 602 includes but is not limited to plastic, metal, or a combination of plastic and metal. In this embodiment of this application, the material of the decoration cover plate 602 may be plastic, reduce costs and reduce the weight of the electronic device 100.

Figure 5:
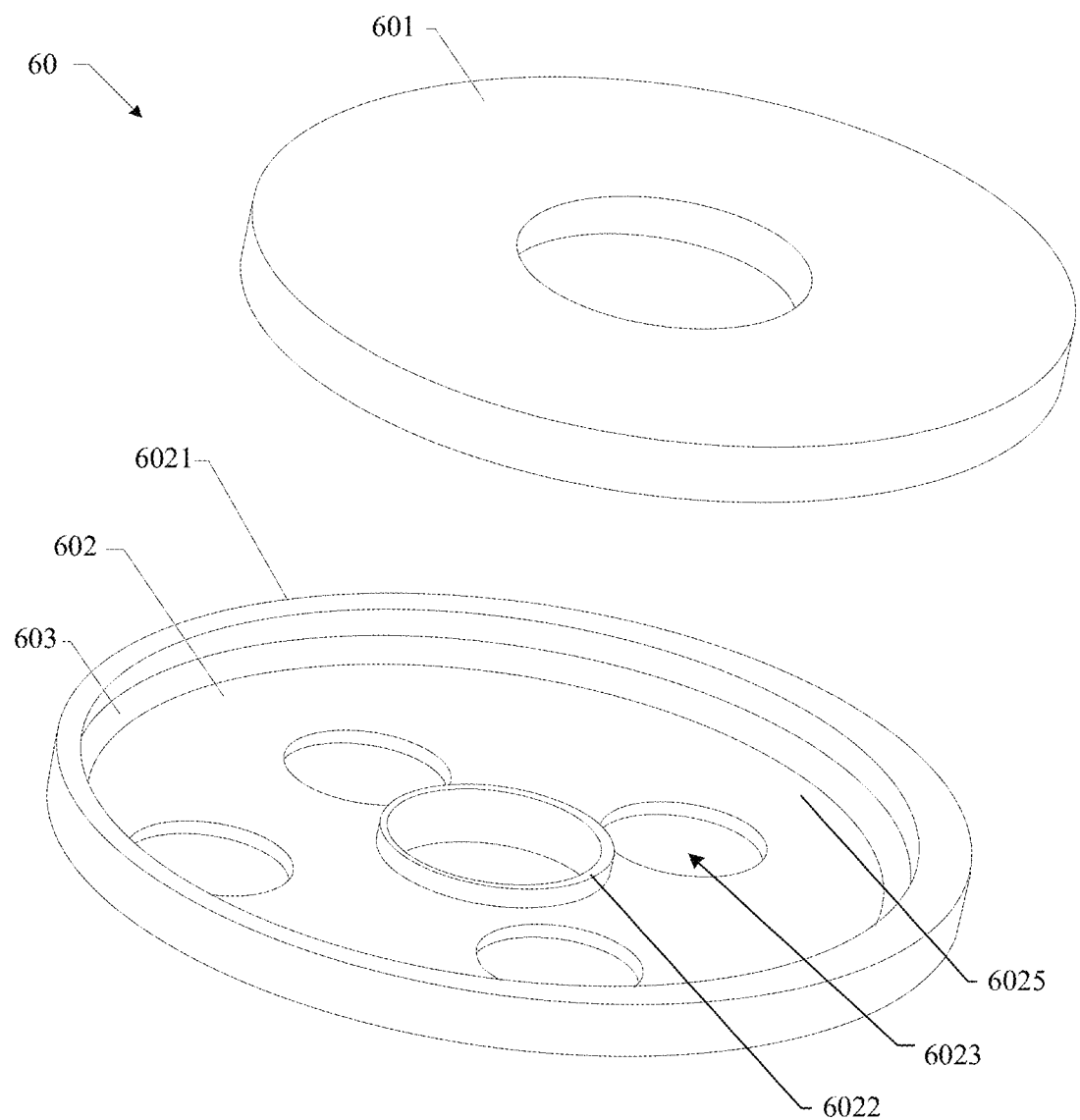
FIG. 5 is an exploded view of a camera decoration cover according to some other embodiments of this application.

Specifically, The shape of the decoration cover plate 602 includes but is not limited to a square, a rectangular, a circle, an ellipse, or a special shape. In other implementations, referring to FIG. 5, FIG. 5 is an exploded view of a camera decoration cover 60 according to some other embodiments of this application. In this embodiment, The shape of the decoration cover plate 602 may also in the shape of a ring, and the camera hole 6023 is provided between an inner edge and an outer edge of the ring-shaped decoration cover plate 602. Specifically, The shape of the decoration cover plate 602 includes but is not limited to a square ring, a rectangular ring, a circular ring, an elliptical ring, or a special circular ring.

Still referring to FIG. 4 and FIG. 5, a first flange 6021 may be arranged on an outer peripheral wall of the decoration cover plate 602, the first flange 6021 may be in the shape of a ring extending fully around a circumferential direction of the decoration cover plate 602, and the first flange 6021 protrudes in a direction away from the camera module 50. In some examples, the first flange 6021 may be fixed to the outer peripheral wall of the decoration cover plate 602 in a manner of welding or adhesion. In some other examples, the first flange 6021 may also be integrally formed with the decoration cover plate 602. It may be understood that the outer peripheral wall of the decoration cover plate 602 may not include the first flange 6021.

Referring to FIG. 5, in a case that the decoration cover plate 602 is in the shape of a ring, a second flange 6022 may further be arranged on an inner peripheral wall of the decoration cover plate 602, the second flange 6022 may be in the shape of a ring extending fully around the circumferential direction of the decoration cover plate 602, and the second flange 6022 in the direction away from the camera module 50. In some examples, the second flange 6022 may be fixed to the inner peripheral wall of the decoration cover plate 602 in a manner of welding or adhesion. In some other examples, the second flange 6022 may also be integrally formed with the decoration cover plate 602. It may be understood that the inner peripheral wall of the decoration cover plate 602 may not include the second flange 6022.

The light-transmitting cover plate 601 is located on one side of the decoration cover plate 602 far away from the camera module 50, and the light-transmitting cover plate 601 and the decoration cover plate 602 are stacked and fixed to each other, so that the light-transmitting cover plate 601 covers at least part of the decoration cover plate 602, that is, the light-transmitting cover plate 601 may partially cover the decoration cover plate 602, or the light-transmitting cover plate 601 may entirely cover the decoration cover plate 602. A region on the decoration cover plate 602 covered by the light-transmitting cover plate 601 is a coverage region 6025, and the camera hole 6023 is located in the coverage region 6025. In this way, the light ray may pass through the light-transmitting cover plate 601 and is emitted into the light-incident surface 5021 of the camera module 50 through the camera hole 6023. In addition, the light-transmitting cover plate 601 may protect the camera module 50 from water and dust.

The material of the light-transmitting cover plate 601 includes but is not limited to glass, a plastic member, or ceramics. In some examples, the light-transmitting cover plate 601 may be a light filter having a function of light filtering, so that the light-transmitting cover plate 601 may replace a light filter in the camera module 50 to play a role of light filtering, and the light filter in the camera module 50 can be omitted, thereby reducing the volume of the camera module 50.

In some examples, referring to FIG. 4, the light-transmitting cover plate 601 may be formed as a square, a rectangular, a circle, an ellipse, or a special shape. Specifically, An outer edge of the light-transmitting cover plate 601 coincides with the outer edge of the decoration cover plate 602 in the XY plane, so that an outer edge of the coverage region 6025 coincides with the outer edge of the decoration cover plate 602.

In some other examples, referring to FIG. 5, the light-transmitting cover plate 601 may also be ring-shaped, so that the coverage region 6025 on the decoration cover plate 602 covered by the light-transmitting cover plate 601 is also ring-shaped. Specifically, The light-transmitting cover plate

601 may be formed as a square ring, a rectangular ring, a circular ring, an elliptical ring, or a special circular ring. Exemplarily, the outer edge of the light-transmitting cover plate 601 coincides with the outer edge of the decoration cover plate 602 in the XY plane, and an inner edge of the light-transmitting cover plate 601 also coincides with the inner edge of the decoration cover plate 602 in the XY plane, so that the outer edge of the coverage region 6025 coincides with the outer edge of the decoration cover plate 602 in the XY plane, and an inner edge of the coverage region 6025 coincides with the inner edge of the decoration cover plate 602 in the XY plane.

Still referring to FIG. 4, the light-transmitting cover plate 601 is located on an inner peripheral side of the first flange 6021, so that mounting of the light-transmitting cover plate 601 and the decoration cover plate 602 may be positioned by using the first flange 6021, and the light-transmitting cover plate 601 may also be limited by using the first flange 6021.

Still referring to FIG. 5, in a case that the decoration cover plate 602 is in the shape of a ring, the light-transmitting cover plate 601 may be ring-shaped, and the light-transmitting cover plate 601 is located between the first flange 6021 and the second flange 6022. In this way, the mounting of the light-transmitting cover plate 601 and the decoration cover plate 602 may be positioned by using the first flange 6021 and the second flange 6022, and the light-transmitting cover plate 601 may also be limited by using the first flange 6021 and the second flange 6022. Certainly, this application is not limited thereto. In a case that the decoration cover plate 602 is ring-shaped, the light-transmitting cover plate 601 may not be ring-shaped and the light-transmitting cover plate 601 no longer includes the second flange 6022, and the light-transmitting cover plate 601 covers a through hole defined by the decoration cover plate 602, the camera hole 6023, and the inner edge of the decoration cover plate 602.

Still referring to FIG. 4 and FIG. 5, the light-transmitting cover plate 601 and the coverage region 6025 of the decoration cover plate 602 are adhered to each other through the adhesive layer 603. Specifically, The adhesive layer 603 is located in the coverage region 6025, the adhesive layer 603 is in the shape of a ring extending fully around a circumferential direction of the coverage region 6025, and the camera hole 6023 is located on an inner peripheral side of the adhesive layer 603. In this way, the adhesive layer 603 may connect the light-transmitting cover plate 601 and the decoration cover plate 602 in the entire circumferential direction of the coverage region 6025, thereby improving reliability of connection between the light-transmitting cover plate 601 and the decoration cover plate 602.

During use, static electricity inevitably exists outside the electronic device 100. Although the adhesive layer 603 can discharge static electricity for the camera module 50 to some extent, static electricity on an outer surface of the camera decoration cover 60 may generally flow into a region between the coverage region 6025 and the light-transmitting cover plate 601 through a gap between an edge of the coverage region 6025 and the light-transmitting cover plate 601. However, as the set quantity of camera modules 50 increases, more camera holes 6023 provided on the decoration cover plate 602 and occupies more space on the decoration cover plate 602. As a result, the width of a region on the decoration cover plate 602 where the adhesive layer 603 is adhered is relatively narrow, static electricity discharged by the adhesive layer 603 is limited, and the static electricity flows into the electronic device 100 through the camera hole 6023 under the guiding action of the gap between the coverage region 6025 and the light-transmitting cover plate 601 and conductive particles on the light-transmitting cover plate 601. A shortest electrostatic discharge path (an electrostatic discharge path indicated by a dashed arrow A1 in FIG. 3) is a metal structure discharged into the camera module 50, for example, the driving motor 503, and/or a metal housing 501, which is likely to damage the camera module 50.

To resolve the foregoing technical problems, in some embodiments of this application, since one part of the mainboard bracket 40 is adjacent to the camera hole 6023, the mainboard bracket 40 is configured as a metal member and configured to be grounded. In this way, static electricity introduced into the electronic device 100 from the camera hole 6023 may be discharged by using the mainboard bracket 40. However, the structure of the mainboard bracket 40 is complex and huge, the weight of a metal mainboard bracket 40 is relatively heavy, and costs is high. In some other embodiments of this application, a conductive fabric or copper foil may also be arranged on an inner peripheral wall of the camera hole 6023, the conductive fabric or the copper foil is grounded, and static electricity at the camera hole 6023 is discharged by using the conductive fabric or the copper foil. Processing costs of such a manner is relatively high.

Further, Static electricity can be discharged to some extent by using the foregoing two implementations, but in the two implementations, static electricity needs to be guided to the camera hole 6023 for discharge. Since the camera hole 6023 is right opposite to the camera module 50, static electricity at the camera hole 6023 that is not discharged is still easily guided to the camera module 50, causing failure of the camera module 50.

Figure 6:
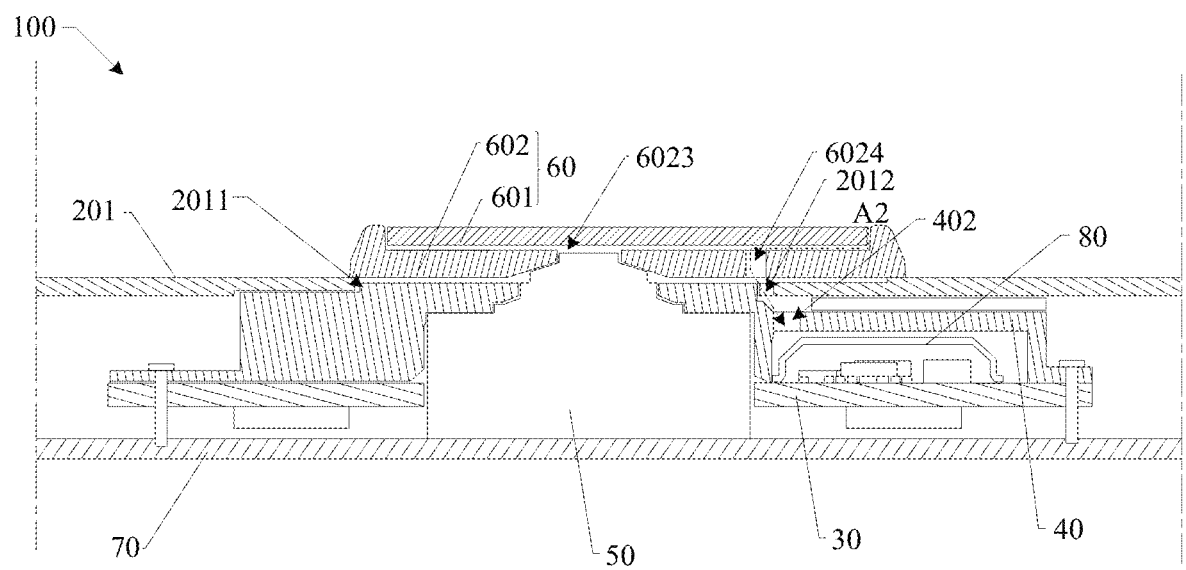
FIG. 6 is a schematic cross-sectional view of a partial structure of an electronic device according to some other embodiments of this application.
Figure 7A:
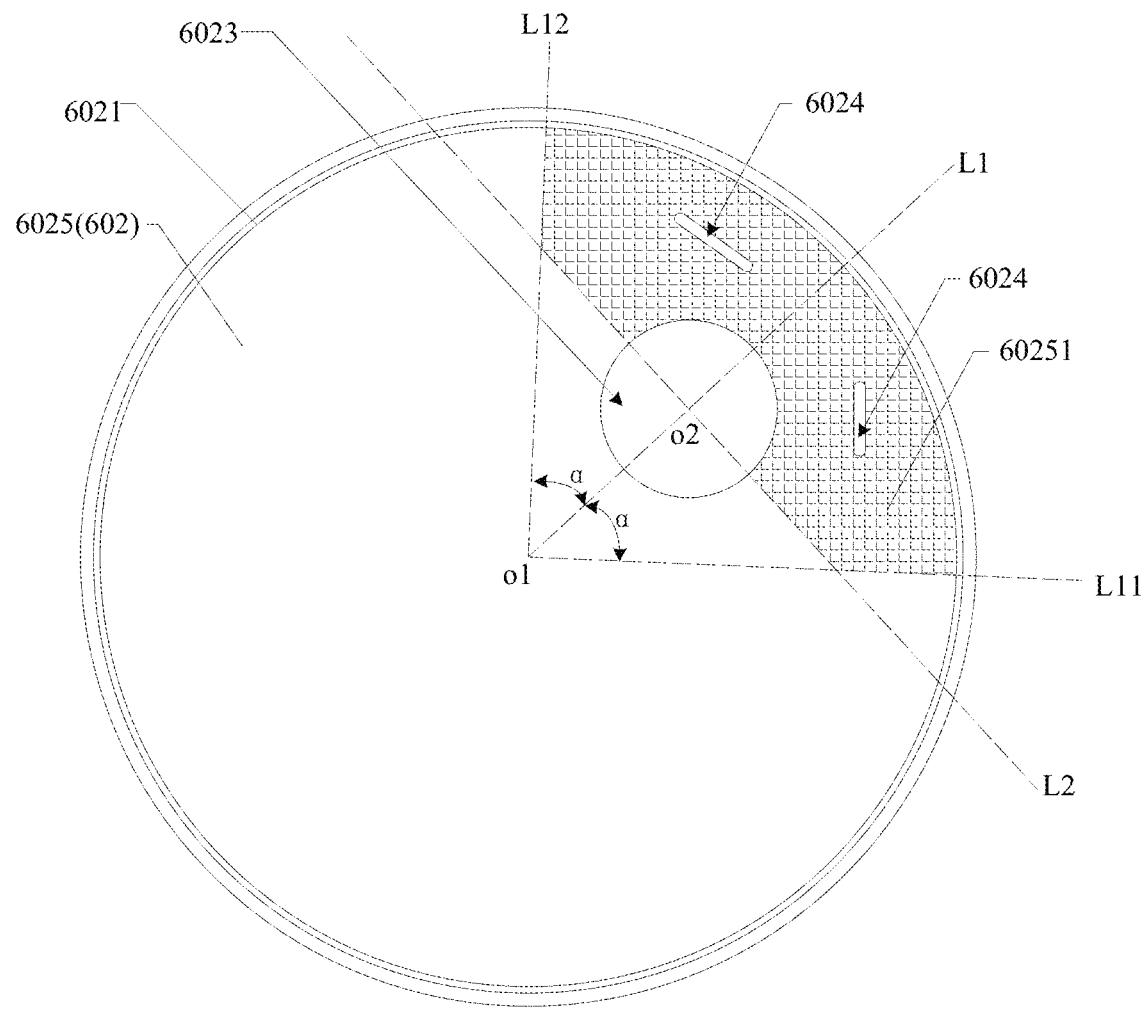
FIG. 7a is a schematic structural diagram of a decoration cover plate of the electronic device shown in FIG. 6.

To further resolve such a technical problem, referring to FIG. 6 and FIG. 7a, FIG. 6 is a schematic cross-sectional view of a partial structure of an electronic device 100 according to some other embodiments of this application, and FIG. 7a is a schematic structural diagram of a decoration cover plate 602 of the electronic device 100 shown in FIG. 6. In this embodiment, The coverage region 6025 includes at least one first region 60251, and the first region 60251 is provided with at least one first static electrostatic discharge hole 6024 corresponding to the camera hole 6023. In other words, each camera hole 6023 may include at least one corresponding first region 60251, and the first region 60251 is provided with at least one first electrostatic discharge hole 6024. Alternatively, at least one first region 60251 may be arranged for some camera holes 6023, the first region 60251 is provided with at least one first electrostatic discharge hole 6024, the first electrostatic discharge hole 6024 is configured for anti-static and protects the camera module 50 in the corresponding camera hole 6023, and other camera holes 6023 do not include the first region 60251 and the first electrostatic discharge hole 6024.

The at least one first electrostatic discharge hole 6024 is spaced apart from the corresponding camera hole 6023. In addition, the at least one first electrostatic discharge hole 6024 corresponds to a first ground member 80. The first ground member 80 and the camera module 50 are independent of each other and the first ground member 80 is grounded.

It may be understood that, that "the at least one first electrostatic discharge hole 6024 corresponds to a first ground member 80" means that the one first electrostatic discharge hole 6024 corresponds to one first ground member 80 in a case that there is one first electrostatic discharge hole 6024 in the first region 60251. Alternatively, the one first electrostatic discharge hole 6024 simultaneously corresponds to a plurality of first ground members 80. In a case that there are a plurality of first electrostatic discharge holes 6024 in the first region 60251, all first electrostatic discharge holes 6024 may correspond to one first ground member 80. Alternatively, different first electrostatic discharge holes 6024 respectively correspond to first ground members 80 with different quantities. Alternatively, different first ground members 80 respectively correspond to first electrostatic discharge holes 6024 with different quantities. Alternatively, the plurality of first ground members 80 and the plurality of first electrostatic discharge holes 6024 are in a one-to-one correspondence. In addition, the first ground member 80 may be shared between first electrostatic discharge holes 6024 corresponding to different camera holes 6023. Alternatively, the first electrostatic discharge holes 6024 corresponding to different camera holes 6023 correspond to different first ground members 80.

A center of the coverage region 6025 is a first center o1, and a center of the camera hole 6023 is a second center o2. The "first center o1" may be a centroid, a center of gravity, or a center of mass of the coverage region 6025. The "second center o2" may be a centroid, a center of gravity, or a center of mass of the camera hole 6023. It is to be noted that, the shapes of the coverage region 6025 and the camera hole 6023 include but are not limited to a circle, a square, a rectangular, a regular polygon, a polygon, or another irregular shape meeting assembly or use requirements.

The first center o1 is spaced apart from the second center o2, that is, the second center o2 of the camera hole 6023 deviates from the first center o1 of the coverage region 6025. A straight line where the first center o1 and the second center o2 lie is a straight line L1.

The first region 60251 is a region formed on one side of the second center o2 far away from the first center o1 by respectively rotating the straight line L1 around the first center o1 toward two sides of the straight line L1 by a first preset angle α. In other words, still referring to FIG. 7, a straight line L11 is obtained by clockwise rotating the straight line L1 around the first center o1 by the first preset angle α. A straight line L12 is obtained by counterclockwise rotating the straight line L1 around the first center o1 by the first preset angle α. A region located on one side of the second center o2 far away from the first center o1 and between the straight line L11 and the straight line L12 is the first region 60251, and the at least one first electrostatic discharge hole 6024 is located in the first region 60251.

The first preset angle α is in a range of (0, 45°]. For example, the value of the first preset angle α is 28°, 30°, 32° 35°, 37°, or 40°.

In some specific examples, still referring to FIG. 7*a*, a straight line perpendicular to the straight line L1 is a straight line L2. The straight line L2 passes through the second center o2. The straight line L11 is obtained by clockwise rotating the straight line L1 around the first center o1 by the first preset angle α. The straight line L12 is obtained by counterclockwise rotating the straight line L1 around the first center o1 by the first preset angle α. A region in the coverage region 6025 located on one side of the straight line L2 far away from the first center o1 and between the straight line L11 and the straight line L12 is the first region 60251 (which is a region indicated by a shaded part in FIG. 7*a*), and the at least one first electrostatic discharge hole 6024 is located in the first region 60251.

Figure 7B:
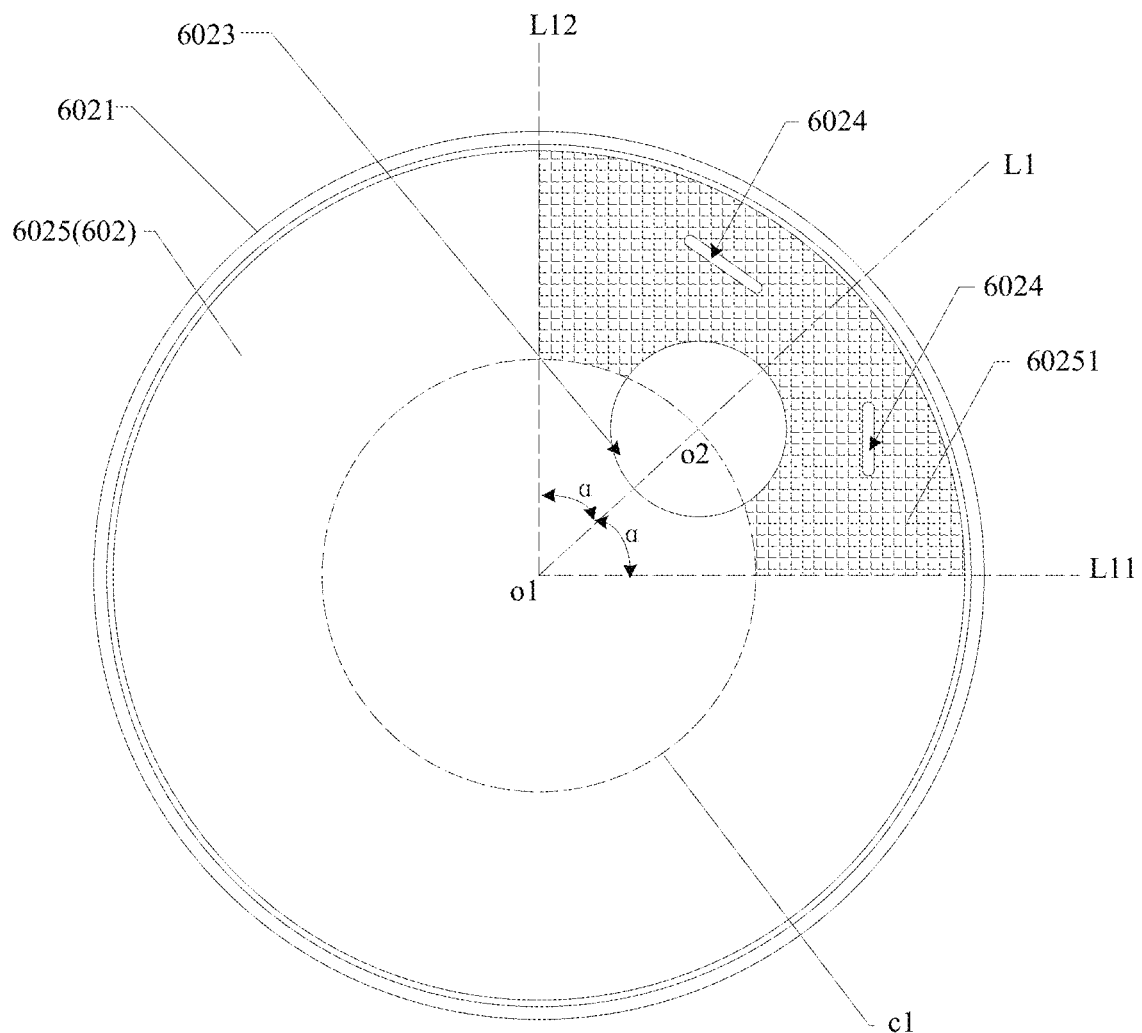
FIG. 7b is a schematic structural diagram of a decoration cover plate of the electronic device shown in FIG. 6.

In some other specific examples, referring to FIG. 7*b*, FIG. 7*b* is a schematic structural diagram of a decoration cover plate 602 of the electronic device 100 shown in FIG. 6. In this embodiment, A circle with the first center o1 as a center of a circle and a distance between the first center o1 and the second center o2 as a radius is a circle c1. The straight line L11 is obtained by clockwise rotating the straight line L1 around the first center o1 by the first preset angle α. The straight line L12 is obtained by counterclockwise rotating the straight line L1 around the first center o1 by the first preset angle α. A region in the coverage region 6025 located between the straight line L11 and the straight line L12, and between an edge of the circle c1 and an outer edge of the coverage region 6025 is the first region 60251 (which is a region indicated by a shaded part in FIG. 7*b*), and the at least one first electrostatic discharge hole 6024 is located in the first region 60251.

It may be understood that, the division of an edge of the first region 60251 adjacent to one side of the first center of is not limited to the forms of the straight line L2 and the circle c1 involved in the foregoing embodiments. In other optional implementations, The edge of the first region 60251 adjacent to one side of the first center of may alternatively be formed by one part of a boundary line in any shape that is centered on the first center of and passes through the second center o2.

According to the camera decoration cover 60 provided in the embodiments of this application, the first region 60251 is a region formed on one side of the second center o2 far away from the first center of by respectively rotating the straight line L1 around the first center of toward two sides of the straight line L1 by a first preset angle α, where the first preset angle α is in a range of (0, 45°], and at least one first electrostatic discharge hole 6024 corresponding to the camera hole 6023 is provided in the first region 60251, so that the first electrostatic discharge hole 6024 may be distributed at a position on a periphery of the camera hole 6023 close to the outer edge of the coverage region 6025, and static electricity located on an outer side of the electronic device 100 first passes through the first electrostatic discharge hole 6024 and then is discharged to the first ground member 80 without being discharged to the camera module 50 through the camera hole 6023. In addition, the first ground member 80 and the camera module 50 are independent of each other (that is, the first ground member 80 is not one part of the camera module 50, and the camera module 50 is not one part of the first ground member 80), so that at least part of the static electricity located on the outer side of the electronic device 100 may not damage the camera module 50, thereby improving a protection effect on the camera module 50.

Further, the first preset angle α is in a range of (0, 25°]. For example, the value of the first preset angle α is 10°, 12°, 15°, 18°, 20°, 22°, or 25°. Based on such configuration, the position of the first electrostatic discharge hole 6024 in the first region 60251 may further be optimized, so that it can be further ensured that the static electricity located on the outer side of the electronic device 100 first passes through the first electrostatic discharge hole 6024 and then is discharged to the first ground member 80 without being discharged to the camera module 50 through the camera hole 6023, thereby improving the protection effect on the camera module 50.

In other examples, there is one camera hole 6023, and the second center o2 of the camera hole 6023 may coincide with the first center o1 of the coverage region 6025. Therefore, the first electrostatic discharge hole 6024 may be provided between the periphery of the camera hole 6023 and the outer edge of the coverage region 6025.

Figure 8:
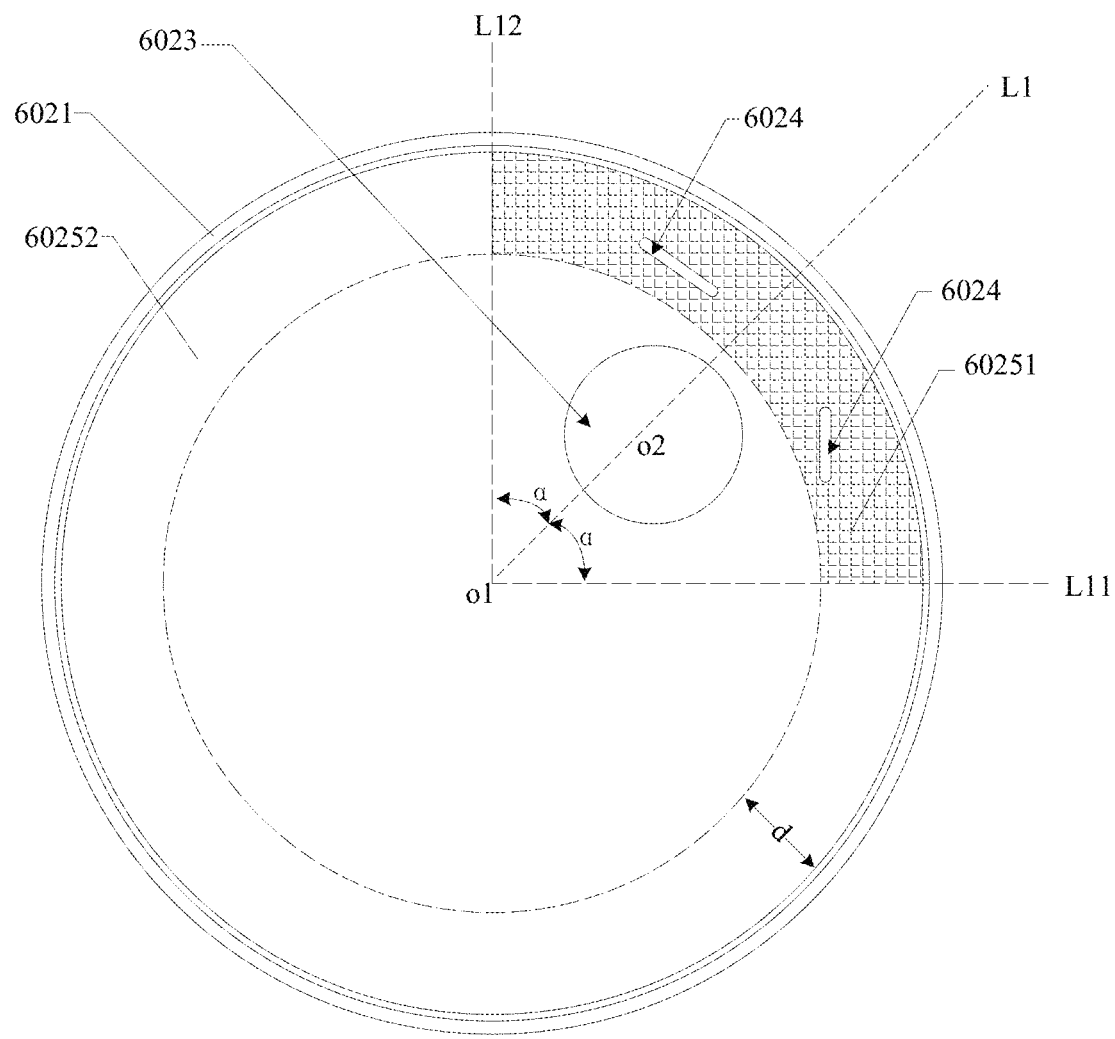

Referring to FIG. 8, FIG. 8 is a schematic structural diagram of the decoration cover plate 602 shown in FIG. 7*a*. The coverage region 6025 includes a first subregion 60252, and the first subregion 60252 is connected to the outer edge of the coverage region 6025. In other words, an outer edge of the first subregion 60252 coincides with the outer edge of the coverage region 6025, an inner edge of the first subregion 60252 (a dotted circle as shown in FIG. 8) is located on an inner peripheral side of the outer edge of the coverage region 6025, and the first subregion 60252 is in the shape of a ring extending fully around the circumferential direction of the coverage region 6025, so that the first subregion 60252 and the first region 60251 have an overlapping region (which is a region indicated by a shaded part in FIG. 8), and the at least one first electrostatic discharge hole 6024 is located in the overlapping region.

Specifically, a distance d between the inner edge of the first subregion 60252 and the outer edge of the coverage region 6025 is in a range of (0, 10 mm]. With such configuration, the position of the first electrostatic discharge hole 6024 may further be optimized, thereby further improving the electrostatic protection effect on the camera module 50.

To further optimize the position of the first electrostatic discharge hole 6024 and improve the electrostatic protection effect on the camera module 50, the distance d between the inner edge of the first subregion 60252 and the outer edge of the coverage region 6025 is 1 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, or 9 mm.

Figure 9:
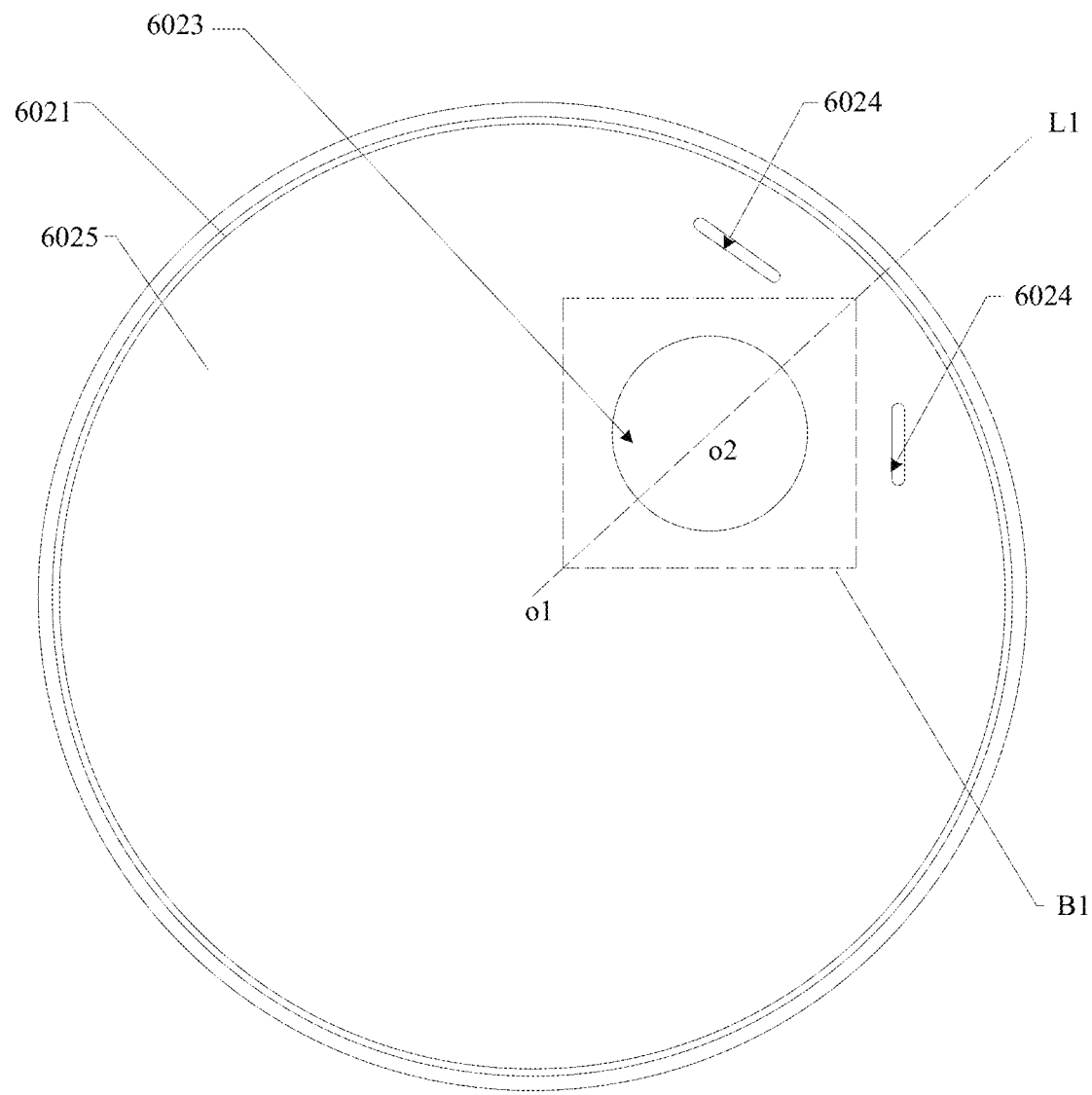

Referring to FIG. 9, FIG. 9 is a schematic structural diagram of the decoration cover plate 602 shown in FIG. 7*a*. In this embodiment, the at least one first electrostatic discharge hole 6024 is located on an outer side of an orthographic projection (for example, a dashed box B1 in FIG. 9) of the corresponding camera module 50 in the coverage region 6025. In other words, the orthographic projection of the camera module 50 in the coverage region 6025 is the dashed box B1, and the at least one first electrostatic discharge hole 6024 corresponding to the camera module 50 is located on an outer side of the dashed box B1. With such configuration, the first electrostatic discharge hole 6024 may be provided to be farther from the camera module 50 in the XY plane, so that the position of the first electrostatic discharge hole 6024 is further optimized, thereby improving the electrostatic protection effect on the camera module 50.

It is to be noted that, the "orthographic projection" of any component in the coverage region 6025 mentioned in this application is a projection in a thickness direction (that is, the Z-axis direction) of the electronic device 100.

Still referring to FIG. 9, each camera hole 6023 corresponds to a plurality of first electrostatic discharge holes 6024, and the first electrostatic discharge holes 6024 are respectively provided on two sides of the straight line L1. Such configuration is beneficial to arrange the first electrostatic discharge hole 6024 according to the position of the camera module 50 and the layout of the first ground member 80 inside the electronic device 100, thereby improving rationality of the structural layout.

Referring to FIG. 9, in this embodiment, an outer peripheral profile of the coverage region 6025 is a circle, the orthographic projection of the camera module 50 in the coverage region 6025 (for example, the rectangular dashed box B1 in FIG. 9) is a rectangle, and the straight line L1 passes through one of diagonals of the orthographic projection of the camera module 50, so that a minimum distance between an edge of the camera hole 6023 and the outer edge of the coverage region 6025 is the size of a portion of the straight line L1 located between the edge of the camera hole 6023 and the outer edge of the coverage region 6025, first electrostatic discharge holes 6024 are respectively provided on two sides of the straight line L1 in the circumferential direction of the coverage region 6025, and the first electrostatic discharge holes 6024 are located on the outer side of the orthographic projection of the camera module 50 in the coverage region 6025. In this way, while the first electrostatic discharge hole 6024 is provided on the outer side of the orthographic projection of the camera module 50 in the coverage region 6025, to ensure that the first electrostatic discharge hole 6024 is provided to be farther from the camera module 50 in the XY plane, thereby improving electrostatic protection capability for the camera module 50, the first electrostatic discharge hole 6024 may be provided larger by fully using a space of the coverage region 6025, thereby improving rationality of the structural layout and further improving the electrostatic protection effect on the camera module 50.

Figure 10:
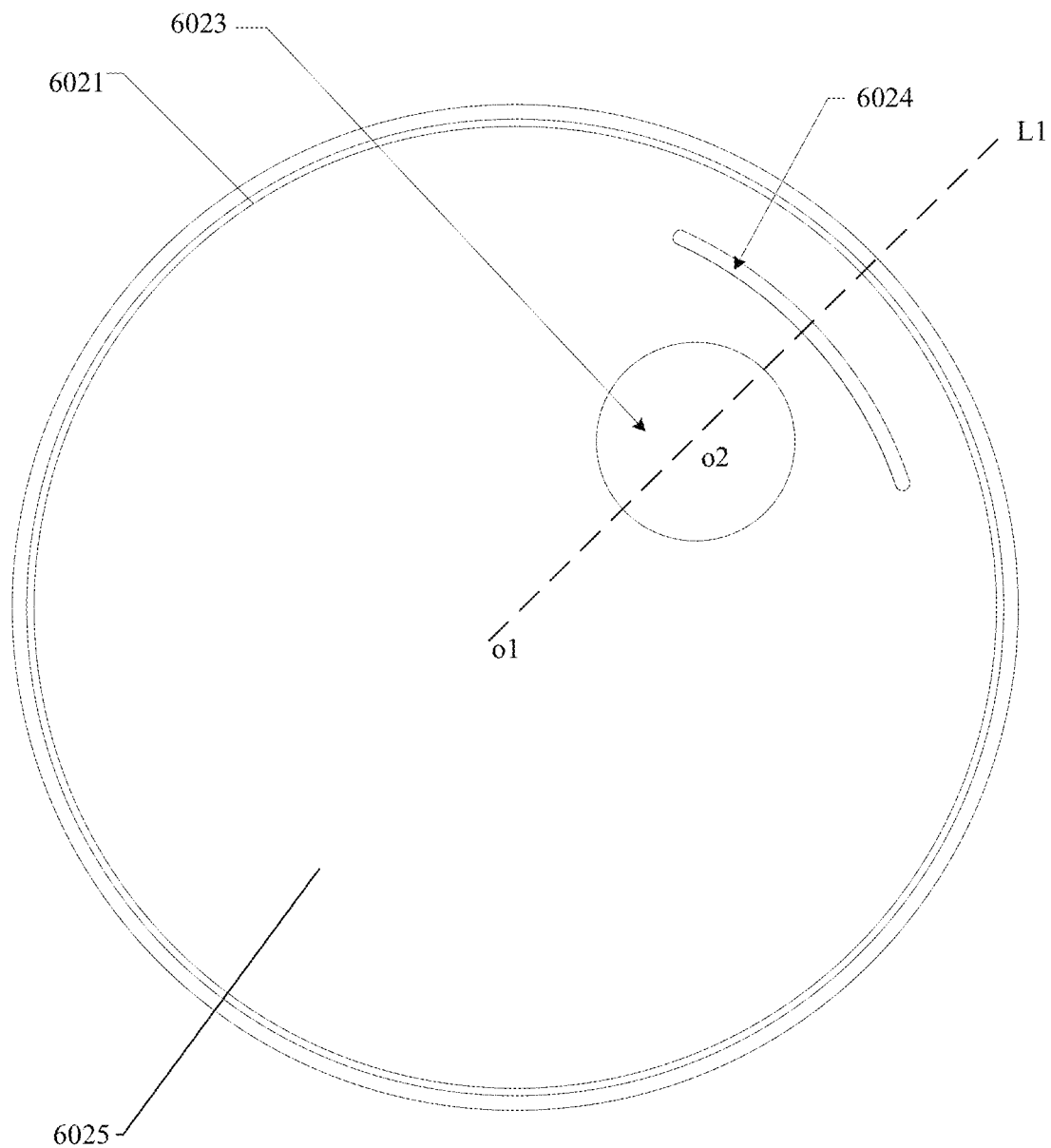
FIG. 10 is a schematic structural diagram of a decoration cover plate according to some other embodiments of this application.

Referring to FIG. 10, FIG. 10 is a schematic structural diagram of a decoration cover plate 602 according to some other embodiments of this application. In this embodiment, the at least one first electrostatic discharge hole 6024 intersects with the straight line L1. Specifically, since the camera hole 6023 deviates from the first center o1 of the coverage region 6025, a distance between the camera hole 6023 corresponding to the straight line L1 and the outer edge of the coverage region 6025 is relatively small. With such configuration, the electrostatic discharge path may be shortened, thereby facilitating timely discharge of static electricity.

Specifically, still referring to FIG. 10, the outer peripheral profile of the coverage region 6025 is circular, the minimum distance between the edge of the camera hole 6023 and the outer edge of the coverage region 6025 corresponds to the size of the portion of the straight line L1 located between the edge of the camera hole 6023 and the outer edge of the coverage region 6025, the camera hole 6023 corresponds to one first electrostatic discharge hole 6024, and the one first electrostatic discharge hole 6024 intersects with the portion of the straight line L1 located between the edge of the camera hole 6023 and the outer edge of the coverage region 6025. With such configuration, the electrostatic discharge path may be shortened, thereby facilitating timely discharge of static electricity.

Based on the foregoing implementations, still referring to FIG. 10 together with FIG. 9, the first electrostatic discharge hole 6024 is an elongated hole, where the elongated hole extends in the circumferential direction of the coverage region 6025. With such configuration, more regions of the camera hole 6023 may be surrounded by the first electrostatic discharge hole 6024 in the circumferential direction of the coverage region 6025, so that it is further ensured that static electricity can be discharged to the first ground member 80 through the first electrostatic discharge hole 6024 in time, thereby improving the electrostatic protection effect on the camera module 50.

Optionally, the elongated hole may extend in an arc, a straight line, or an irregular curve as long as the elongated hole extends in the circumferential direction of the coverage region 6025.

Figure 11:
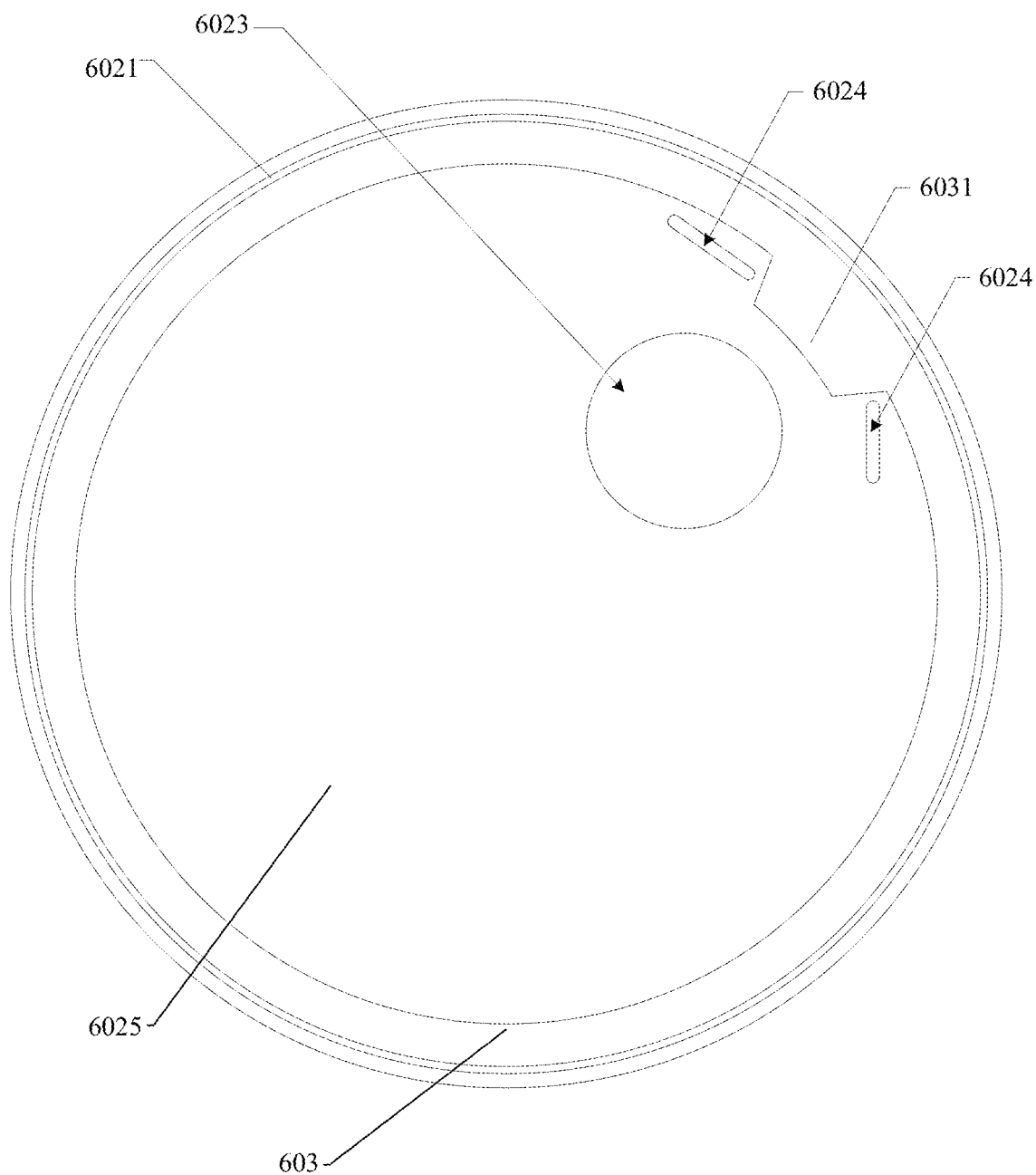
FIG. 11 is a schematic diagram of a connection between the decoration cover plate shown in FIG. 9 and an adhesive layer and a protruding adhesive layer portion.

Referring to FIG. 11, FIG. 11 is a schematic diagram of a connection between the decoration cover plate 602 shown in FIG. 9 and an adhesive layer 603 and a protruding adhesive layer portion 6031. In this embodiment, the first electrostatic discharge hole 6024 is located on an inner peripheral side of the adhesive layer 603, and the protruding adhesive layer portion 6031 is arranged on an inner edge of the adhesive layer 603. The protruding adhesive layer portion 6031 protrudes toward the camera hole 6023, and the protruding adhesive layer portion 6031 is located in the first region 60251. The adhesive layer 603 has a certain anti-static effect, and the arrangement of the protruding adhesive layer portion 6031 may widen the width of the adhesive layer 603 on the protruding adhesive layer portion 6031. In this way, the electrostatic protection effect on the camera module 50 is further improved by using protruding adhesive layer portion 6031 while the anti-static effect on the camera module 50 is achieved through cooperation between the first electrostatic discharge hole 6024 and the first ground member 80.

Specifically, still referring to FIG. 11, each camera hole 6023 corresponds to a plurality of first electrostatic discharge holes 6024, and the protruding adhesive layer portion 6031 is provided with the first electrostatic discharge holes 6024 respectively on two sides of a circumferential direction of the camera hole 6023. Such configuration is beneficial to arrange the first electrostatic discharge hole 6024 according to the position of the camera module 50 and the layout of the first ground member 80 inside the electronic device 100, thereby improving rationality of the structural layout. In some other embodiments, the decoration cover plate 602 may only include the protruding adhesive layer portion 6031, and there is no first electrostatic discharge hole 6024 arranged.

Optionally, the protruding adhesive layer portion 6031 and the adhesive layer 603 may be integrated. Certainly, this application is not limited thereto. In other embodiments, the protruding adhesive layer portion 6031 may also be adhered to the adhesive layer 603.

Based on the foregoing implementations, in some embodiments of this application, referring to FIG. 6 again, the camera decoration cover 60 is covered on the mounting opening 2011, the camera decoration cover 60 is located on one side of the rear cover 201 far away from the camera module 50, a first via hole 2012 is provided on a portion of the rear cover 201 corresponding to the coverage region 6025, an orthographic projection of the first via hole 2012 in the coverage region 6025 overlaps the first electrostatic discharge hole 6024, and static electricity introduced by the first electrostatic discharge hole 6024 is guided to the first ground member 80 through the first via hole 2012.

Exemplarily, an orthographic projection of the first via hole 2012 in the coverage region 6025 completely overlaps (or coincides with each other) the first electrostatic discharge hole 6024. For example, an outer edge of the orthographic projection of the first via hole 2012 in the coverage region 6025 is the same as and consistent with an outer edge of the first electrostatic discharge hole 6024.

In another example, the orthographic projection of the first via hole 2012 in the coverage region 6025 partially overlaps the first electrostatic discharge hole 6024. For example, one part of the orthographic projection of the first via hole 2012 in the coverage region 6025 is located within the first electrostatic discharge hole 6024. In another example, the orthographic projection of the first via hole 2012 in the coverage region 6025 is located within the first electrostatic discharge hole 6024. In still another example, the entire first electrostatic discharge hole 6024 or one part of the first electrostatic discharge hole 6024 is located in the orthographic projection of the first via hole 2012 in the coverage region 6025.

In this way, the first via hole 2012 is provided, and the orthographic projection of the first via hole 2012 in the coverage region 6025 overlaps the first electrostatic discharge hole 6024, so that the first via hole 2012 may be in communication with the first electrostatic discharge hole 6024, and the electrostatic discharge path may be shortened, thereby facilitating timely discharge of static electricity to the first ground member 80 through the first electrostatic discharge hole 6024 and the first via hole 2012.

It may be understood that, "overlap" between A and B in any two shape (for example, A is the orthographic projection of the first via hole 2012 in the coverage region 6025, and B is the first electrostatic discharge hole 6024) mentioned in this application includes full overlap (that is, coincidence) between A and B and partial overlap between A and B. The full overlap between A and B means that an outer edge of A is the same as and consistent with an outer edge of B. The partial overlap means that A is located inside the outer edge of B, or one part of A is located inside the outer edge of B and the other part of A is located outside the outer edge of B; or B is located inside the outer edge of A, or one part of B is located inside the outer edge of A and the other part of B is located outside the outer edge of A. Still referring to FIG. 6, a second via hole 402 is provided on the mainboard bracket 40, and the orthographic projection of the first via hole 2012 in the coverage region 6025 overlaps an orthographic projection of the second via hole 402 in the coverage region 6025. Exemplarily, the orthographic projection of the first via hole 2012 in the coverage region 6025 completely overlaps the orthographic projection of the second via hole 402 in the coverage region 6025. In another example, the orthographic projection of the first via hole 2012 in the coverage region 6025 partially overlaps the orthographic projection of the second via hole 402 in the coverage region 6025. With such configuration, the first via hole 2012 may be in communication with the second via hole 402, thereby facilitating timely discharge of static electricity to the first ground member 80 through a discharge path including the first electrostatic discharge hole 6024, the first via hole 2012, and the second via hole 402 (which is an electrostatic discharge path indicated by a dashed arrow A2 in FIG. 6).

Figure 12:
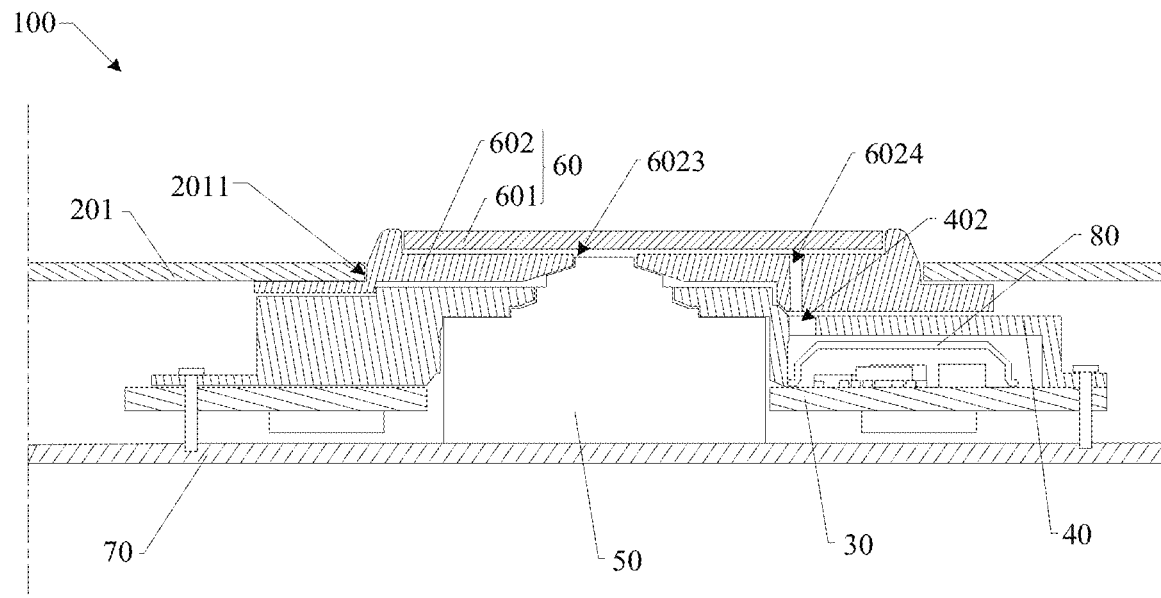
FIG. 12 is a schematic cross-sectional view of a partial structure of an electronic device according to yet other embodiments of this application.

In some other embodiments of this application, referring to FIG. 12, FIG. 12 is a schematic cross-sectional view of a partial structure of an electronic device 100 according to yet some other embodiments of this application. In this embodiment, Since the decoration cover plate 602 is located inside the mounting opening 2011, and the rear cover 201 does not include a portion corresponding to the decoration cover plate 602, the first via hole 2012 is no longer provided on the rear cover 201, and the second via hole 402 corresponding to the first electrostatic discharge hole 6024 is directly provided on the mainboard bracket 40. In this way, the second via hole 402 is provided, thereby facilitating the timely discharge of static electricity to the first ground member 80 through the first electrostatic discharge hole 6024 and the second via hole 402.

Specifically, still referring to FIG. 12, the orthographic projection of the second via hole 402 in the coverage region 6025 overlaps the first electrostatic discharge hole 6024. Exemplarily, the orthographic projection of the second via hole 402 in the coverage region 6025 completely overlaps the first electrostatic discharge hole 6024. In another example, the orthographic projection of the second via hole 402 in the coverage region 6025 partially overlaps the first electrostatic discharge hole 6024. With such configuration, the electrostatic discharge path may be shortened.

Based on the foregoing implementations, still referring to FIG. 6 and FIG. 12, the first ground member 80 is mounted on one side of the main circuit board 30 facing the camera decoration cover 60, and orthographic projections of the first ground member 80 and the second via hole 402 in the coverage region 6025 are overlapped. With such configuration, the electrostatic discharge path may be shortened, thereby facilitating timely discharge of static electricity to the first ground member 80.

Optionally, in a case that the first via hole 2012 is provided on the rear cover 201, orthographic projections of the first electrostatic discharge hole 6024 and the first via hole 2012 in the coverage region 6025, the orthographic projection of the second via hole 402 in the coverage region 6025, and an orthographic projection of the first ground member 80 in the coverage region 6025 are all overlapped. Therefore, the electrostatic discharge path may be significantly shortened.

Optionally, in a case that the first via hole 2012 is no longer provided on the rear cover 201, the orthographic projections of the first electrostatic discharge hole 6024 and the second via hole 402 in the coverage region 6025, and the orthographic projection of the first ground member 80 in the coverage region 6025 are all overlapped. Therefore, the electrostatic discharge path may be significantly shortened.

In some embodiments of this application, still referring to FIG. 6 and FIG. 12, the first ground member 80 is a shielding cover located between the mainboard bracket 40 and the main circuit board 30. In this way, the first ground member 80 is configured as the shielding cover, and therefore, on the one hand, the shielding cover may play a role of discharging static electricity and protecting the camera module 50; and on the other hand, the shielding cover may be covered on components on the main circuit board 30 and play a role of electromagnetic shielding, so that functions of a shielding cover originally located on the main circuit board 30 may be increased, and there is no need to additionally arrange the first ground member 80, thereby simplifying the structure of the electronic device 100 and reducing production costs.

Figure 13:
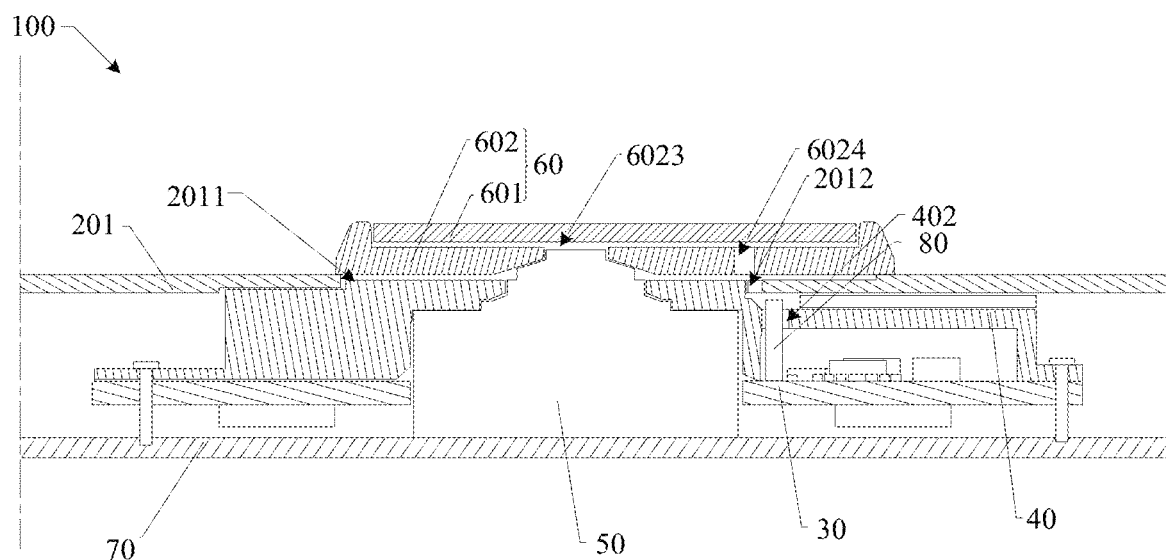
FIG. 13 is a schematic cross-sectional view of a partial structure of an electronic device according to still other embodiments of this application.

In some other embodiments of this application, referring to FIG. 13, FIG. 13 is a schematic cross-sectional view of a partial structure of an electronic device 100 according to still other embodiments of this application. In this embodiment, one end of the first ground member 80 is mounted on one side of the main circuit board 30 facing the camera decoration cover 60, and the other end of the first ground member 80 extends toward the camera decoration cover 60 and passes through the second via hole 402. Based on such configuration, static electricity is directly discharged to the first ground member 80 protruding from the second via hole 402 without flowing through the second via hole 402, thereby shortening the electrostatic discharge path. Specifically, in this embodiment, the first ground member 80 may be constructed as a metal elastic piece, a metal column, or a TVS (transient voltage suppressor) device.

Figure 14:
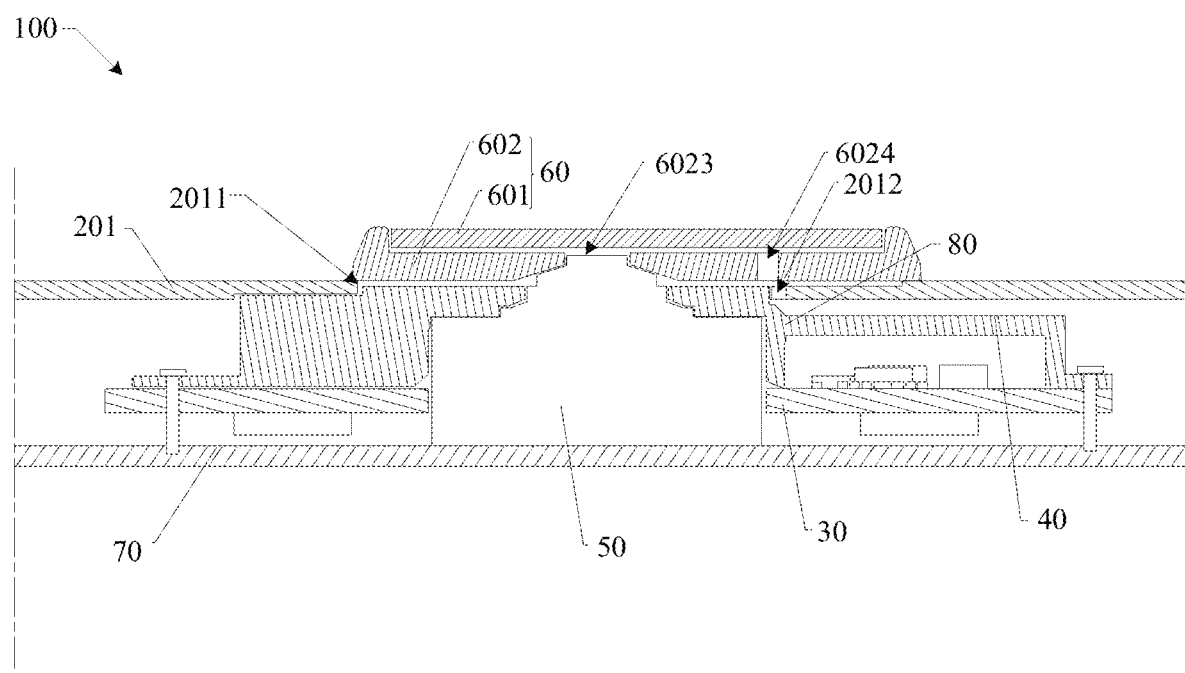
FIG. 14 is a schematic cross-sectional view of a partial structure of an electronic device according to still other embodiments of this application.

In still other embodiments of this application, referring to FIG. 14, FIG. 14 is a schematic cross-sectional view of a partial structure of an electronic device 100 according to still other embodiments of this application. The mainboard bracket 40 may no longer be provided with the second via hole 402, and instead, at least one part of the mainboard bracket 40 is configured as the first ground member 80. With such configuration, the electrostatic discharge path may be shortened while the structural strength of the mainboard bracket 40 is ensured.

Optionally, one part of the mainboard bracket 40 adjacent to the first electrostatic discharge hole 6024 is constructed as the first ground member 80.

Exemplarily, in a case that the first via hole 2012 is provided on the rear cover 201, still referring to FIG. 14, an orthographic projection of the part of the mainboard bracket 40 that is constructed as the first ground member 80 in the coverage region 6025 overlaps the orthographic projection of the first via hole 2012 in the coverage region 6025. With such configuration, the electrostatic discharge path may be shortened. Certainly, this application is not limited thereto. The entire mainboard bracket 40 may be constructed as the first ground member 80 to simplify processes of processing and manufacturing.

Exemplarily, in a case that the first via hole 2012 is no longer provided on the rear cover 201, the orthographic projection of the part of the mainboard bracket 40 that is constructed as the first ground member 80 in the coverage region 6025 overlaps the orthographic projection of the first electrostatic discharge hole 6024 in the coverage region 6025. With such configuration, the electrostatic discharge path may be shortened. Certainly, this application is not limited thereto. The entire mainboard bracket 40 may be constructed as the first ground member 80 to simplify processes of processing and manufacturing.

Based on any foregoing implementation, the coverage region 6025 may be formed in the shape of a ring. For a ring-shaped coverage region 6025, in addition to an outer edge, the coverage region 6025 further includes an inner edge. Static electricity on an outer surface of the camera decoration cover 60 may flow into a region between the coverage region 6025 and the light-transmitting cover plate 601 through a gap between the inner edge of the coverage region 6025 and the light-transmitting cover plate 601, and then may be discharged to the camera module 50 through the camera hole 6023, causing damage to the camera module 50. Technical solutions are further provided below to resolve the technical problems. After reading the technical solutions of this application, a person skilled in the art may understand that, any technical solution mentioned below may be an improvement made to any one of the foregoing technical solutions based on the first electrostatic discharge hole 6024, or may be a technical solution that does not provide the first electrostatic discharge hole 6024 and is parallel to the technical solution based on the first electrostatic discharge hole 6024.

Figure 15A:
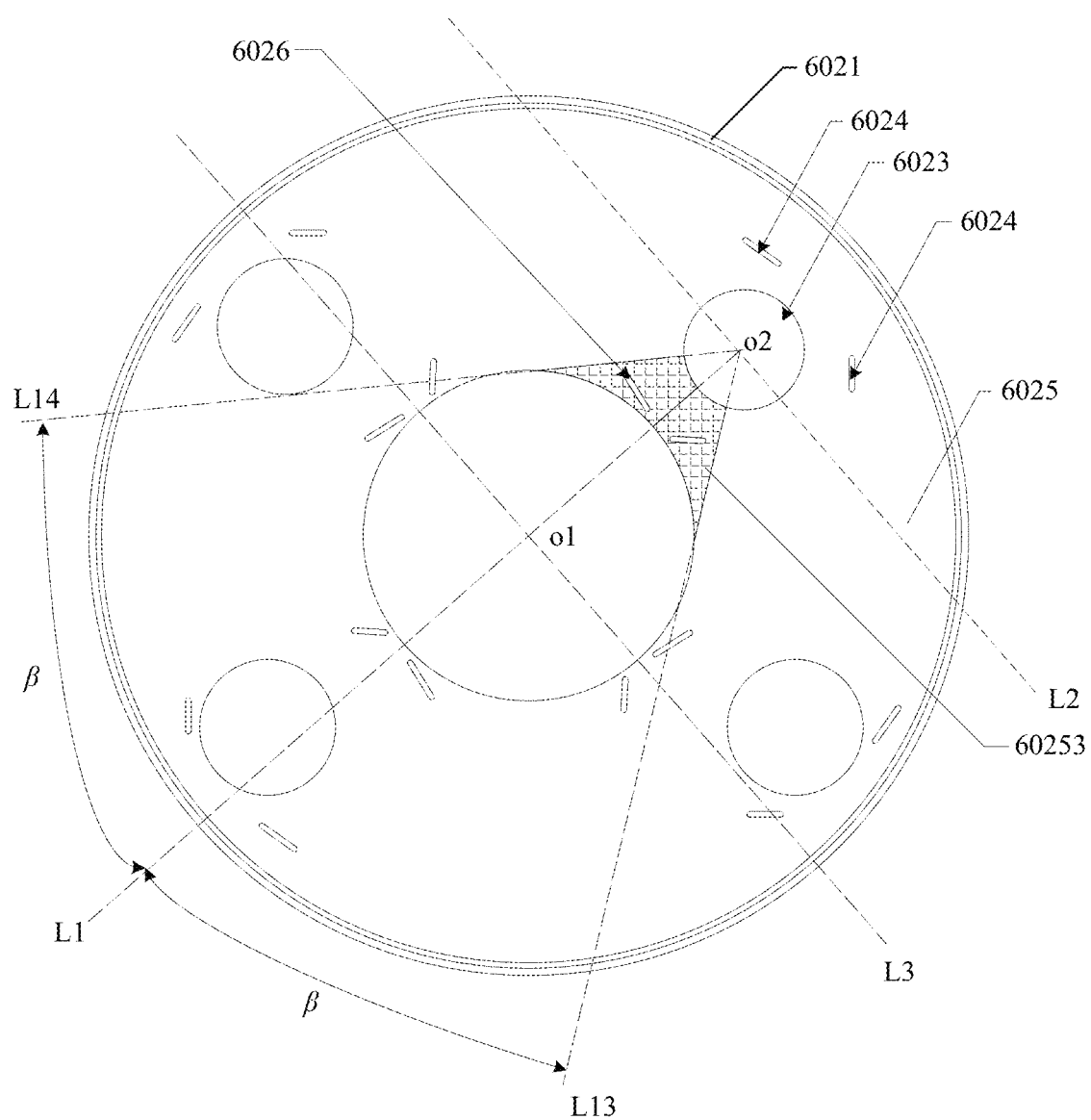
FIG. 15a is a schematic structural diagram of a decoration cover plate according to yet other embodiments of this application.

Referring to FIG. 15a, FIG. 15a is a schematic structural diagram of a decoration cover plate 602 according to yet other embodiments of this application. In this embodiment, the coverage region 6025 includes at least one second region 60253, where the second region 60253 is provided with at least one second electrostatic discharge hole 6026 corresponding to the camera hole 6023. In other words, each camera hole 6023 may correspondingly include at least one second region 60253, where the second region 60253 is provided with at least one second electrostatic discharge hole 6026. Alternatively, at least one second region 60253 may be correspondingly arranged for some camera holes 6023, where the second region 60253 is provided with at least one second electrostatic discharge hole 6026, and the second electrostatic discharge hole 6026 is configured for anti-static and protects the camera module 50 in the corresponding camera hole 6023, and other camera holes 6023 do not include the second region 60253 and the second electrostatic discharge hole 6026.

The at least one second electrostatic discharge hole 6026 is spaced apart from the corresponding camera hole 6023. In addition, the at least one second electrostatic discharge hole 6026 corresponds to a second ground member 90. The second ground member 90 and the camera module 50 are independent of each other and the second ground member 90 is grounded.

It may be understood that, that "the at least one second electrostatic discharge hole 6026 corresponds to a second ground member 90" means that the one second electrostatic discharge hole 6026 corresponds to a second ground member 90 in a case that there is one second electrostatic discharge hole 6026 in the second region 60253. Alternatively, the one second electrostatic discharge hole 6026 simultaneously corresponds to a plurality of second ground members 90. In a case that there are a plurality of second electrostatic discharge holes 6026 in the second region 60253, all second electrostatic discharge holes 6026 may correspond to one second ground member 90. Alternatively, different second electrostatic discharge holes 6026 respectively correspond to second ground members 90 with different quantities. Alternatively, different second ground members 90 respectively correspond to second electrostatic discharge holes 6026 with different quantities. Alternatively, the plurality of second ground members 90 and the plurality of second electrostatic discharge holes 6026 are in a one-to-one correspondence. In addition, the second ground member 90 may be shared between second electrostatic discharge holes 6026 corresponding to different camera holes 6023. Alternatively, the second electrostatic discharge holes 6026 corresponding to different camera holes 6023 correspond to different second ground members 90.

Optionally, the second ground member 90 and the first ground member 80 may be the same or different components.

Still referring to FIG. 15*a*, the second region 60253 is a region formed on one side of the second center o2 adjacent to the first center o1 by respectively rotating the straight line L1 around the second center o2 toward two sides of the straight line L1 by a second preset angle β. In other words, still referring to FIG. 15*a*, a straight line L14 is obtained by clockwise rotating the straight line L1 around the second center o2 by the second preset angle β, and a straight line L13 is obtained by counterclockwise rotating the straight line L1 around the second center o2 by the second preset angle β. A region located on one side of the second center o2 adjacent to the first center o1, and located between the straight line L13 and the straight line L14 is the second region 60253, and the at least one second electrostatic discharge hole 6026 is located in the second region 60253.

The second preset angle β is in a range of (0, 45°]. For example, the value of the second preset angle is 28°, 30°, 32° 35°, 37°, or 40°. Optionally, the second preset angle and the first preset angle may be the same or different.

In some specific examples, still referring to FIG. 15*a*, a straight line perpendicular to the straight line L1 is a straight line L3. The straight line L3 passes through the first center o1. The straight line L14 is obtained by clockwise rotating the straight line L1 around the second center o2 by the second preset angle β, the straight line L13 is obtained by counterclockwise rotating the straight line L1 around the second center o2 by the second preset angle β, a region of the coverage region 6025 located between the straight line L3 and the straight line L2 and between the straight line L13 and the straight line L14 is the second region 60253 (which is a region indicated by a shaded part in FIG. 15*a*), and the at least one second electrostatic discharge hole 6026 is located in the second region 60253.

Figure 15B:
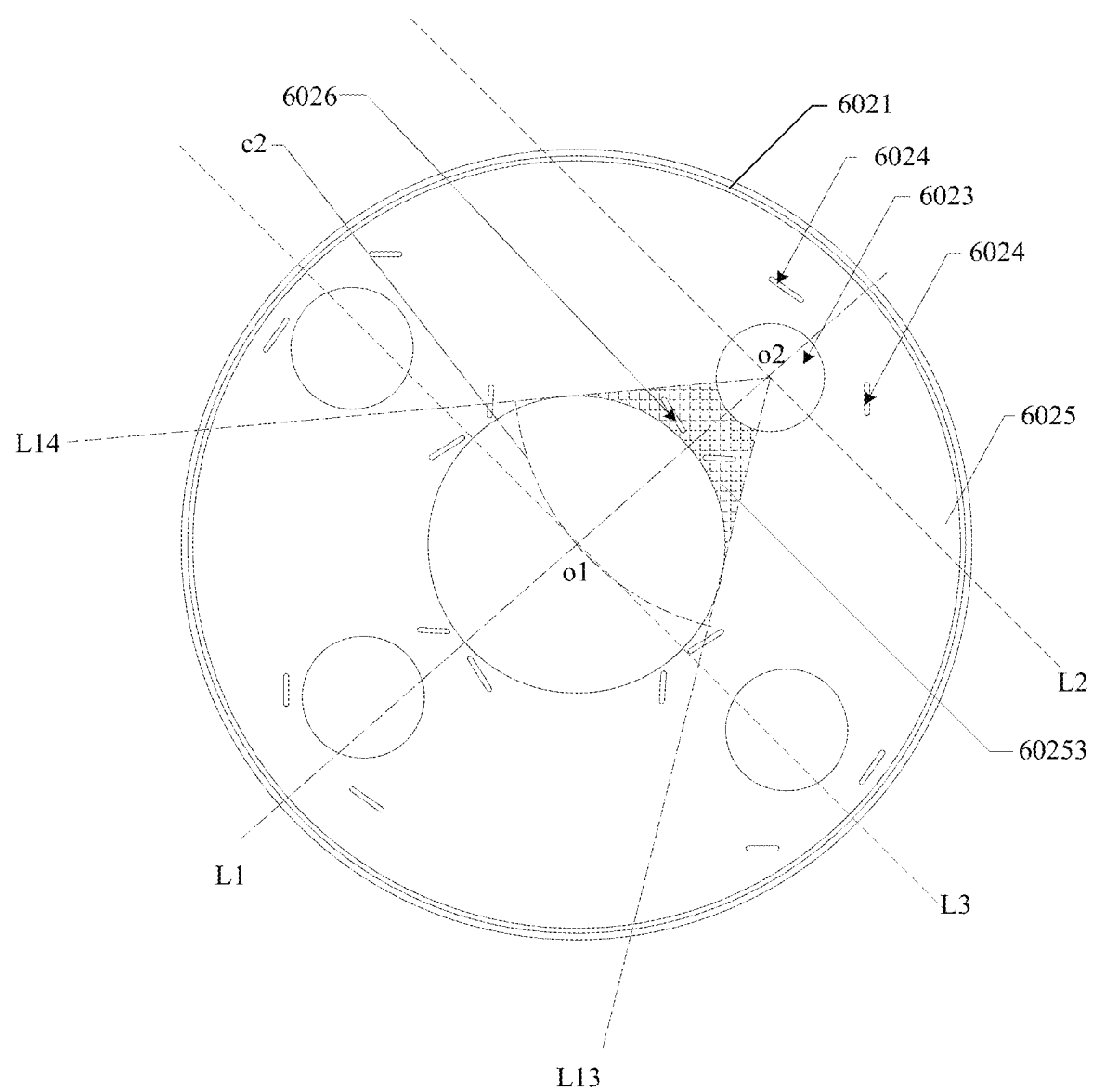
FIG. 15b is a schematic structural diagram of a decoration cover plate according to yet other embodiments of this application.

In some other specific examples, referring to FIG. 15*b*, FIG. 15*b* is a schematic structural diagram of a decoration cover plate 602 according to yet other embodiments of this application. In this embodiment, a circle with the second center o2 as a center of a circle and a distance between the first center o1 and the second center o2 as a radius is a circle c2. The straight line L14 is obtained by clockwise rotating the straight line L1 around the second center o2 by the second preset angle β, the straight line L13 is obtained by counterclockwise rotating the straight line L1 around the second center o2 by the second preset angle β, the circle c2 respectively intersects with the straight line L14 and the straight line L13, a region of the coverage region 6025 located between the circle c2, the straight line L13, and the straight line L14 is the second region 60253 (which is a region indicated by a shaded part in FIG. 15*b*), and the at least one second electrostatic discharge hole 6026 is located in the second region 60253.

It may be understood that, the division of an edge on one side of the second region 60253 far away from the second center o2 is not limited to the forms of the straight line L3 and the circle c2 involved in the foregoing embodiments. In other optional implementations, the edge of the second region 60253 far away from one side of the second center o2 may alternatively be formed by one part of a boundary line in any shape that takes the second center o2 as a geometric center and passes through the first center o1.

In this way, the second electrostatic discharge hole 6026 may be distributed at a position on a periphery of the camera hole 6023 adjacent to the inner edge of the coverage region 6025, and static electricity located on an outer side of the electronic device 100 first passes through the second electrostatic discharge hole 6026 and then is discharged to the second ground member 90 without being discharged to the camera module 50 through the camera hole 6023. In addition, the second ground member 90 and the camera module 50 are independent of each other (that is, the second ground member 90 is not one part of the camera module 50, and the camera module 50 is not one part of the second ground member 90), so that at least part of the static electricity located on the outer side of the electronic device 100 may not damage the camera module 50, thereby improving the protection effect on the camera module 50.

Further, the second preset angle β is in a range of (0, 25°]. For example, the value of the second preset angle is 10°, 12°, 15°, 18°, 20°, 22°, or 25°. In this way, it is ensured that static electricity located on the outer side of the electronic device 100 first passes through the second electrostatic discharge hole 6026 and then is discharged to the second ground member 90 without being discharged to the camera module 50 through the camera hole 6023. In addition, the second ground member 90 and the camera module 50 are independent of each other (that is, the second ground member 90 is not the part of the camera module 50, and the camera module 50 is not the part of the second ground member 90), so that at least part of the static electricity located on the outer side of the electronic device 100 may not damage the camera module 50, thereby improving the protection effect on the camera module 50.

Specifically, still referring to FIG. 15*a*, the straight line L14 is tangent to the inner edge of the coverage region 6025, and the straight line L13 is tangent to the inner edge of the coverage region 6025. In this case, the second region 60253 is a region defined by the inner edge of the coverage region 6025 and the straight lines L14 and L13. With such configuration, the position of the second electrostatic discharge hole 6026 may further be optimized, and the electrostatic protection effect on the camera module 50 is improved.

Figure 16:
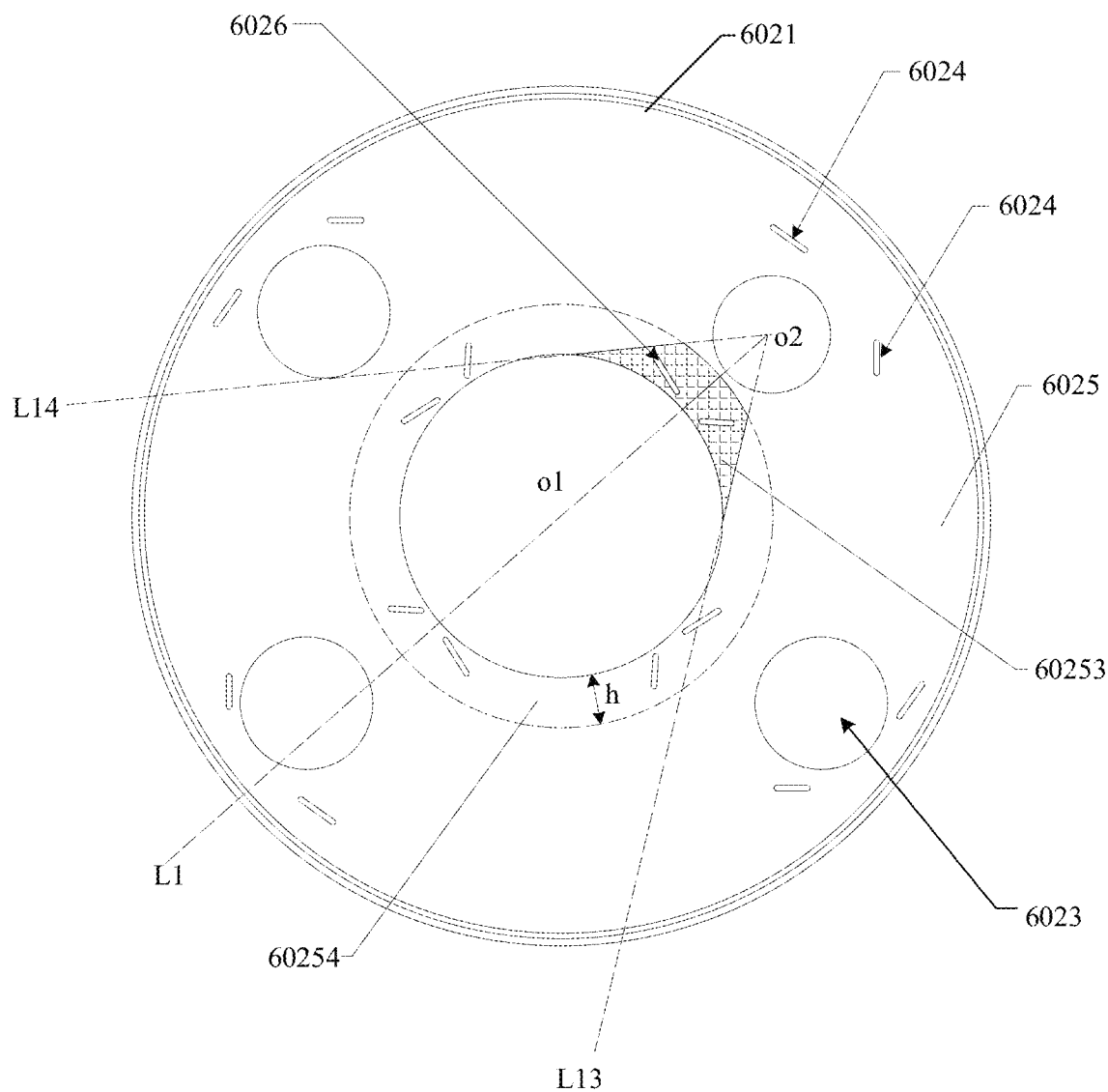

Referring to FIG. 16, FIG. 16 is a schematic structural diagram of the decoration cover plate 602 shown in FIG. 15*a*. The coverage region 6025 includes a second subregion 60254. The second subregion 60254 is connected to the inner edge of the coverage region 6025. In other words, an inner edge of the second subregion 60254 coincides with the inner edge of the coverage region 6025. An outer edge of the second subregion 60254 is located on a periphery of the inner edge of the coverage region 6025, and the second subregion 60254 is in the shape of a ring extending fully around the circumferential direction of the coverage region 6025. In this way, the second subregion 60254 and the second region 60253 have an overlapping region (which is a region indicated by a shaded part in FIG. 16), and the at least one second electrostatic discharge hole 6026 is located in the overlapping region.

Specifically, a distance h between the outer edge of the second subregion 60254 and the inner edge of the coverage region 6025 is in a range of (0, 10 mm]. With such configuration, the position of the second electrostatic discharge hole 6026 may further be optimized, thereby further improving the electrostatic protection effect on the camera module 50.

To further optimize the position of the second electrostatic discharge hole 6026 and improve the electrostatic protection effect on the camera module 50, the value of the distance h between the outer edge of the second subregion 60254 and the inner edge of the coverage region 6025 is 1 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, or 9 mm.

Figure 17:
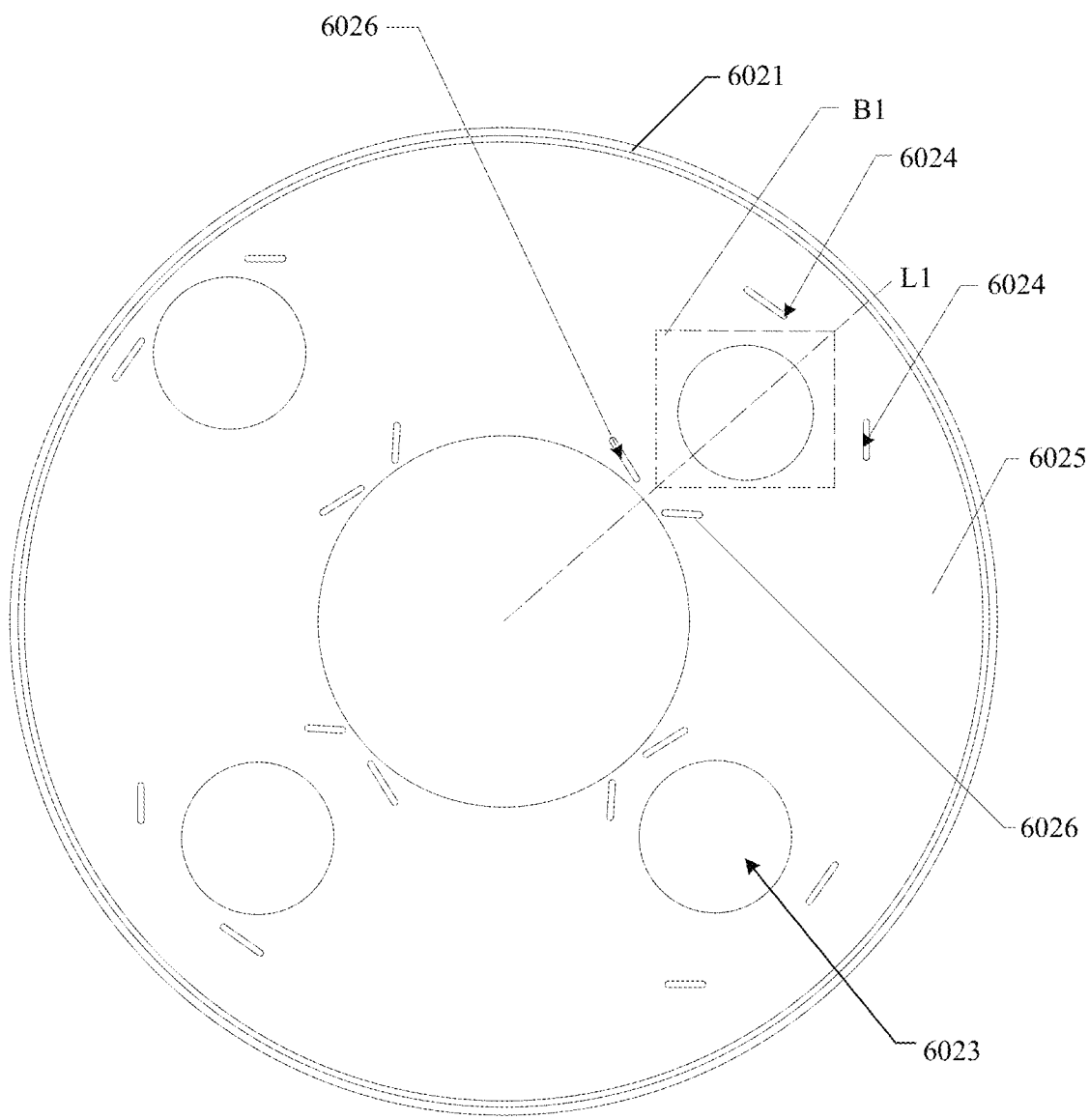

Referring to FIG. 17, FIG. 17 is a schematic structural diagram of the decoration cover plate 602 shown in FIG. 15a. In this embodiment, the at least one second electrostatic discharge hole 6026 is located on an outer side of an orthographic projection (for example, a rectangular dashed box B1 in FIG. 17) of the corresponding camera module 50 in the coverage region 6025. In other words, in a direction perpendicular to the coverage region 6025, the orthographic projection of the camera module 50 in the coverage region 6025 is B1, and the at least one second electrostatic discharge hole 6026 corresponding to the camera module 50 is located on an outer side of B1. With such configuration, the second electrostatic discharge hole 6026 may be provided to be farther from the camera module 50 in the XY plane, so that the position of the second electrostatic discharge hole 6026 is further optimized, thereby improving the electrostatic protection effect on the camera module 50.

Still referring to FIG. 17, each camera hole 6023 corresponds to a plurality of second electrostatic discharge holes 6026, and the second electrostatic discharge holes 6026 are respectively provided on two sides of the straight line L1. Such configuration is beneficial to arrange the second electrostatic discharge hole 6026 according to the position of the camera module 50 and the layout of the second ground member 90 inside the electronic device 100, thereby improving rationality of the structural layout.

Still referring to FIG. 17, in this embodiment, the coverage region 6025 is in the shape of a circular ring, the orthographic projection of the camera module 50 in the coverage region 6025 (for example, the rectangular dashed box B1 in FIG. 17) is a rectangle, and the straight line L1 is collinear with one of diagonals of the rectangle, so that a minimum distance between an edge of the camera hole 6023 and the inner edge of the coverage region 6025 is the size of a portion of the straight line L1 located between the edge of the camera hole 6023 and the inner edge of the coverage region 6025, second electrostatic discharge holes 6026 are respectively provided on two sides of the straight line L1 in the circumferential direction of the coverage region 6025, and the second electrostatic discharge holes 6026 are located on the outer side of the orthographic projection of the camera module 50 in the coverage region 6025. In this way, while the second electrostatic discharge hole 6026 is provided on the outer side of the orthographic projection of the camera module 50 in the coverage region 6025, to ensure that the second electrostatic discharge hole 6026 is provided to be farther from the camera module 50 in the XY plane, thereby improving electrostatic protection capability for the camera module 50, the second electrostatic discharge hole 6026 may be provided larger by completely covering a space of the coverage region 6025, thereby improving rationality of the structural layout and further improving the electrostatic protection effect on the camera module 50.

Figure 18:
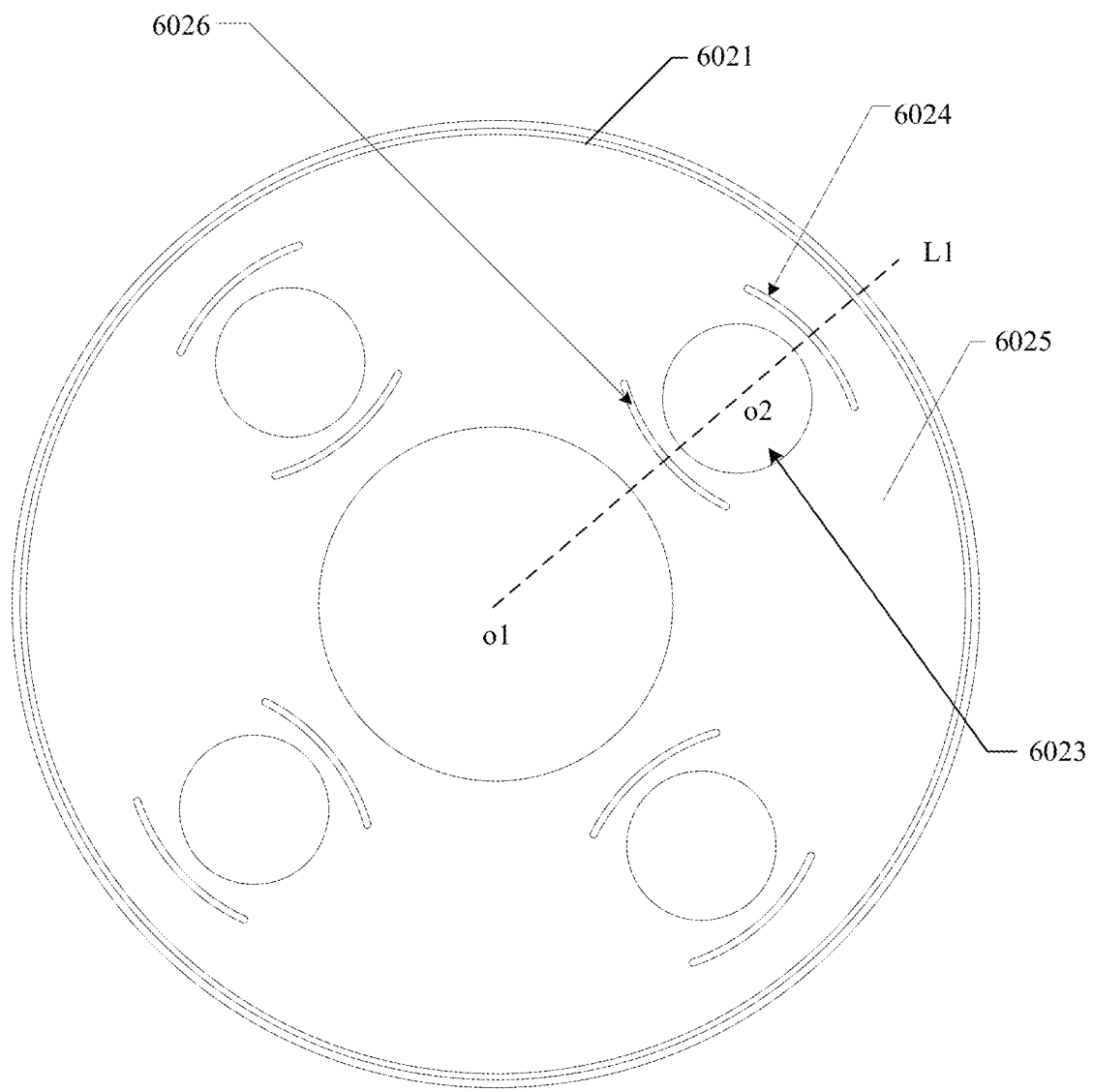
FIG. 18 is a schematic diagram of a decoration cover plate according to still other embodiments of this application.

Referring to FIG. 18, FIG. 18 is a schematic diagram of a decoration cover plate 602 according to still other embodiments of this application. In this embodiment, the at least one second electrostatic discharge hole 6026 intersects with the straight line L1. With such configuration, the electrostatic discharge path may be shortened, thereby facilitating timely discharge of static electricity.

Specifically, still referring to FIG. 18, an inner peripheral profile of the coverage region 6025 is circular, the minimum distance between the edge of the camera hole 6023 and the inner edge of the coverage region 6025 corresponds to the size of the portion of the straight line L1 located between the edge of the camera hole 6023 and the inner edge of the coverage region 6025, the camera hole 6023 corresponds to one second electrostatic discharge hole 6026, and the one second electrostatic discharge hole 6026 intersects with the portion of the straight line L1 located between the edge of the camera hole 6023 and the inner edge of the coverage region 6025. With such configuration, the electrostatic discharge path may be shortened, thereby facilitating timely discharge of static electricity.

Based on the foregoing implementations, still referring to FIG. 18 together with FIG. 17, the second electrostatic discharge hole 6026 is an elongated hole, where the elongated hole extends in the circumferential direction of the coverage region 6025. With such configuration, more regions of the camera hole 6023 may be surrounded by the second electrostatic discharge hole 6026 in the circumferential direction of the coverage region 6025, so that it is further ensured that static electricity can be discharged to the second ground member 90 through the second electrostatic discharge hole 6026 in time, thereby improving the electrostatic protection effect on the camera module 50.

Optionally, the elongated hole may extend in an arc, a straight line, or an irregular curve as long as the elongated hole extends in the circumferential direction of the coverage region 6025.

Figure 19:
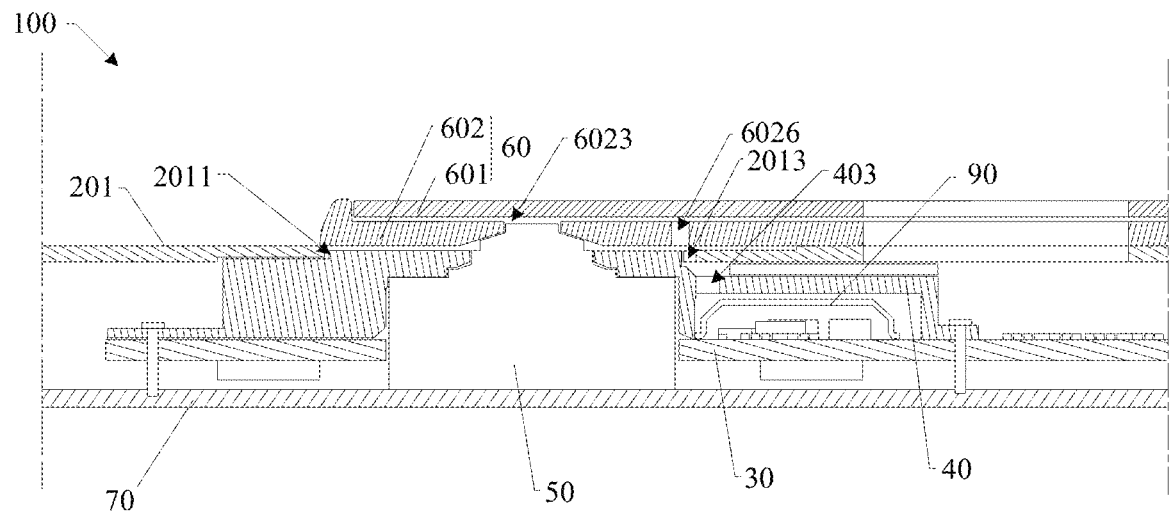
FIG. 19 is a schematic cross-sectional view of a partial structure of an electronic device according to some other embodiments of this application.

Based on the foregoing implementations, in some embodiments of this application, referring to FIG. 19, FIG. 19 is a schematic cross-sectional view of a partial structure of an electronic device 100 according to some other embodiments of this application. In this embodiment, the camera decoration cover 60 is covered on the mounting opening 2011, the camera decoration cover 60 is located on one side of the rear cover 201 far away from the camera module 50, and the mounting opening 2011 and the camera hole 6023 are in a one-to-one correspondence. A first communication hole 2013 is provided on a portion of the rear cover 201 corresponding to the coverage region 6025, the first communication hole 2013 and the second electrostatic discharge hole 6026 are in a one-to-one correspondence, an orthographic projection of the first communication hole 2013 in the coverage region 6025 overlaps the second electrostatic discharge hole 6026, and static electricity introduced by the second electrostatic discharge hole 6026 is guided to the second ground member 90 through the first communication hole 2013. In this way, the first communication hole 2013 is provided, and the orthographic projection of the first communication hole 2013 in the coverage region 6025 overlaps the second electrostatic discharge hole 6026, so that the first communication hole 2013 may be in communication with the second electrostatic discharge hole 6026, and the electrostatic discharge path may be shortened, thereby facilitating timely discharge of static electricity to the second ground member 90 through the second electrostatic discharge hole 6026 and the first communication hole 2013.

Exemplarily, the orthographic projection of the first communication hole 2013 in the coverage region 6025 completely overlaps the second electrostatic discharge hole 6026. In other words, the orthographic projection of the first communication hole 2013 in the coverage region 6025 completely coincides with the second electrostatic discharge hole 6026.

In another example, the orthographic projection of the first communication hole 2013 in the coverage region 6025 partially overlaps the second electrostatic discharge hole 6026. For example, the orthographic projection of the first communication hole 2013 in the coverage region 6025 is partially located within the second electrostatic discharge hole 6026. In another example, the orthographic projection of the first communication hole 2013 in the coverage region 6025 is located within the second electrostatic discharge hole 6026. In still another example, the second electrostatic discharge hole 6026 is located within the orthographic projection of the first communication hole 2013 in the coverage region 6025.

Still referring to FIG. 19, a second communication hole 403 is provided on the mainboard bracket 40, the orthographic projection of the first communication hole 2013 in the coverage region 6025 overlaps an orthographic projection of the second communication hole 403 in the coverage region 6025. Exemplarily, the orthographic projection of the first communication hole 2013 in the coverage region 6025 completely overlaps the orthographic projection of the second communication hole 403 in the coverage region 6025. In another example, the orthographic projection of the first communication hole 2013 in the coverage region 6025 partially overlaps the orthographic projection of the second communication hole 403 in the coverage region 6025. With such configuration, the first communication hole 2013 may be in communication with the second communication hole 403, so that the electrostatic discharge path is shortened, thereby facilitating timely discharge of static electricity to the second ground member 90 through the second electrostatic discharge hole 6026, the first communication hole 2013, and the second communication hole 403.

Figure 20:
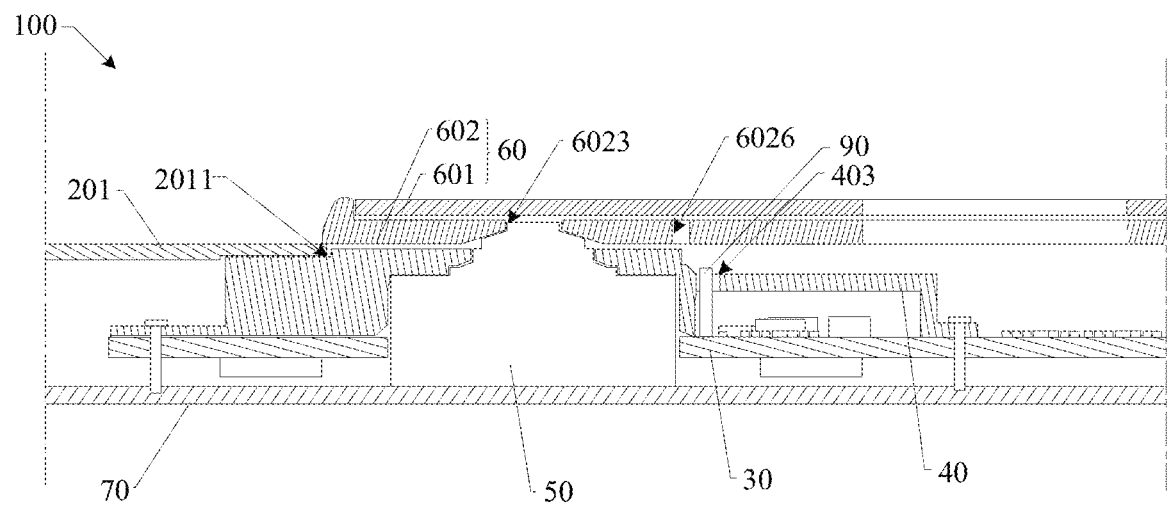
FIG. 20 is a schematic cross-sectional view of a partial structure of an electronic device according to yet some other embodiments of this application.

In some other embodiments of this application, referring to FIG. 20, FIG. 20 is a schematic cross-sectional view of a partial structure of an electronic device 100 according to yet some other embodiments of this application. In this embodiment, the mounting opening 2011 is a larger opening, and all camera holes 6023 and second electrostatic discharge holes 6026 correspond to the mounting opening 2011. Therefore, there is no need to additionally arrange the first communication hole 2013 on the rear cover 201, and instead, the second communication hole 403 corresponding to the second electrostatic discharge hole 6026 is directly provided on the mainboard bracket 40, so that the second communication hole 403 is provided, thereby facilitating the timely discharge of static electricity to the second ground member 90 through the second electrostatic discharge hole 6026 and the second communication hole 403.

Specifically, still referring to FIG. 20, the orthographic projection of the second communication hole 403 in the coverage region 6025 overlaps the second electrostatic discharge hole 6026. Exemplarily, the orthographic projection of the second via hole 402 in the coverage region 6025 completely overlaps the second electrostatic discharge hole 6026. In another example, the orthographic projection of the second via hole 402 in the coverage region 6025 partially overlaps the second electrostatic discharge hole 6026. With such configuration, the electrostatic discharge path may be shortened.

Based on the foregoing implementations, still referring to FIG. 19 and FIG. 20, the second ground member 90 is mounted on one side of the main circuit board 30 facing the camera decoration cover 60, and orthographic projections of the second ground member 90 and the second communication hole 403 in the coverage region 6025 are overlapped. With such configuration, the electrostatic discharge path may be shortened, thereby facilitating timely discharge of static electricity to the second ground member 90.

Optionally, in a case that the first communication hole 2013 is provided on the rear cover 201, still referring to FIG. 19, orthographic projections of the second electrostatic discharge hole 6026 and the first communication hole 2013 in the coverage region 6025, the orthographic projection of the second communication hole 403 in the coverage region 6025, and the orthographic projection of the second ground member 90 in the coverage region 6025 are all overlapped. Therefore, the electrostatic discharge path may be significantly shortened.

Optionally, in a case that the first communication hole 2013 is no longer provided on the rear cover 201, still referring to FIG. 20, orthographic projections of the second electrostatic discharge hole 6026 and the second communication hole 403 in the coverage region 6025 and the orthographic projection of the second ground member 90 in the coverage region 6025 are all overlapped. Therefore, the electrostatic discharge path may be significantly shortened.

In some embodiments of this application, still referring to FIG. 19, the second ground member 90 is a shielding cover located between the mainboard bracket 40 and the main circuit board 30. In this way, the second ground member 90 is configured as the shielding cover, and therefore, on the one hand, the shielding cover may play a role of discharging static electricity and protecting the camera module 50; and on the other hand, the shielding cover may be covered on components on the main circuit board 30 and play a role of electromagnetic shielding, so that functions of a shielding cover originally located on the main circuit board 30 may be increased, and there is no need to additionally arrange the second ground member 90, thereby simplifying the structure of the electronic device 100 and reducing production costs.

In some other embodiments of this application, referring to FIG. 20, one end of the second ground member 90 is mounted on one side of the main circuit board 30 facing the camera decoration cover 60, and the other end of the second ground member 90 extends toward the camera decoration cover 60 and passes through the second communication hole 403. Based on such configuration, static electricity is directly discharged to the second ground member 90 protruding from the second communication hole 403 without flowing through the second communication hole 403, thereby shortening the electrostatic discharge path. Specifically, the second ground member 90 may be constructed as a metal elastic piece, a metal column, or a TVS (transient voltage suppressor) device.

Figure 21:
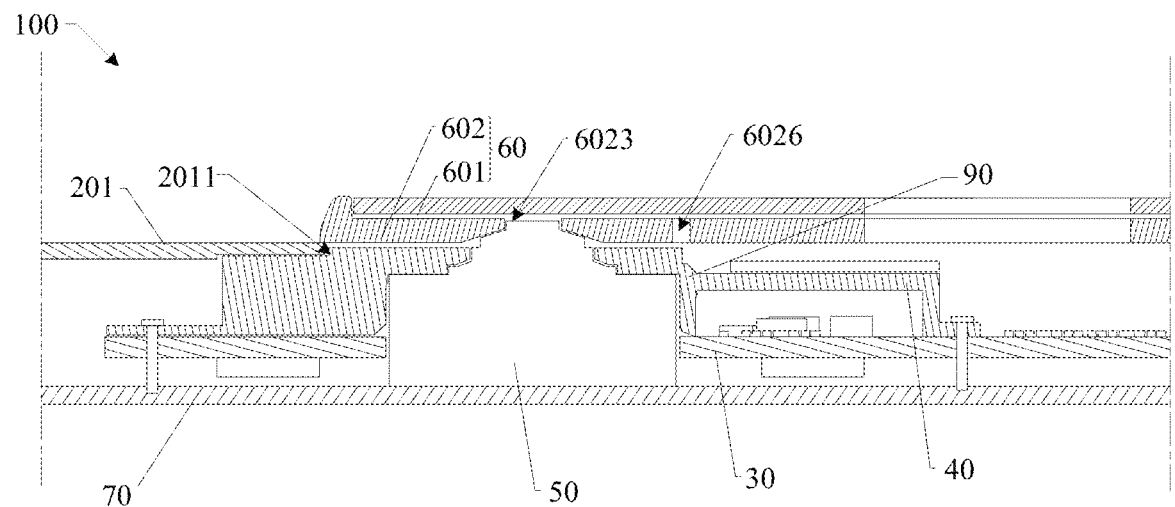
FIG. 21 is a schematic cross-sectional view of a partial structure of an electronic device according to still some other embodiments of this application.

In still other embodiments of this application, referring to FIG. 21, FIG. 21 is a schematic cross-sectional view of a partial structure of an electronic device 100 according to still some other embodiments of this application. The mainboard bracket 40 may no longer be provided with the second communication hole 403, and instead, at least one part of the mainboard bracket 40 is configured as the second ground member 90. With such configuration, the electrostatic discharge path may be shortened while the structural strength of the mainboard bracket 40 is ensured.

Optionally, one part of the mainboard bracket 40 adjacent to the second electrostatic discharge hole 6026 is constructed as the second ground member 90.

Exemplarily, in a case that the first communication hole 2013 is provided on the rear cover 201, an orthographic projection of the part of the mainboard bracket 40 that is constructed as the second ground member 90 in the coverage region 6025 overlaps the orthographic projection of the first communication hole 2013 in the coverage region 6025. With such configuration, the electrostatic discharge path may be shortened. Certainly, this application is not limited thereto. The entire mainboard bracket 40 may be constructed as the second ground member 90 to simplify processes of processing and manufacturing.

Exemplarily, in a case that the first communication hole 2013 is no longer provided on the rear cover 201, referring to FIG. 21, the orthographic projection of the part of the mainboard bracket 40 that is constructed as the second ground member 90 in the coverage region 6025 overlaps the orthographic projection of the second electrostatic discharge hole 6026 in the coverage region 6025. With such configuration, the electrostatic discharge path may be shortened. Certainly, this application is not limited thereto. The entire mainboard bracket 40 may be constructed as the second ground member 90 to simplify processes of processing and manufacturing.

In the descriptions of this specification, the described specific features, structures, materials, or characteristics may be combined in a proper manner in any one or more of the embodiments or examples.

Finally, it should be noted that the foregoing embodiments are merely used for describing the technical solutions of this application, but are not intended to limit this application. Although this application is described in detail with reference to the foregoing embodiments, persons of ordinary skill in the art are to understand that they may still make modifications to the technical solutions described in the foregoing embodiments or make equivalent replacements to some technical features thereof, and such modifications or replacements will not cause the essence of corresponding technical solutions to depart from the spirit and scope of the technical solutions in the embodiments of this application.

What is claimed is:

1. A camera decoration cover, comprising:
a decoration cover plate; and
a light-transmitting cover plate stacked with the decoration cover plate;
wherein a region covered by the light-transmitting cover plate on the decoration cover plate is a coverage region, and at least one camera hole is provided in the coverage region; wherein the coverage region comprises at least one first region with at least one first electrostatic discharge hole corresponding to the camera hole; wherein a center of the coverage region is a first center, and a center of the camera hole is a second center; wherein the first region is a region located on one side of the second center far away from the first center, and the first region is formed by respectively rotating a straight line where the first center and the second center lie around the first center toward two sides of the straight line by a first preset angle, and the first preset angle is in a range of (0, 45°].

2. The camera decoration cover of claim 1, wherein the first preset angle is in a range of (0°, 25°].

3. The camera decoration cover of claim 1, wherein the coverage region comprises a first subregion connected to an outer edge of the coverage region, the first subregion is in a shape of a ring extending fully around a circumferential direction of the coverage region, a distance between an inner edge of the first subregion and the outer edge of the coverage region is in a range of (0, 10 mm], and the at least one first electrostatic discharge hole is located in the first subregion.

4. The camera decoration cover of claim 1, wherein the at least one first electrostatic discharge hole intersects with the straight line.

5. The camera decoration cover of claim 1, wherein the first electrostatic discharge holes are respectively provided on two sides of the straight line.

6. The camera decoration cover of claim 1, wherein the first electrostatic discharge hole is an elongated hole, and the first electrostatic discharge hole extends in a circumferential direction of the coverage region.

7. The camera decoration cover of claim 1, wherein the camera decoration cover further comprising an adhesive layer; wherein the adhesive layer is located in the coverage region and is connected between the decoration cover plate and the light-transmitting cover plate, the adhesive layer is in a shape of a ring extending fully around a circumferential direction of the coverage region, and the camera hole and the first electrostatic discharge hole are located on an inner peripheral side of the adhesive layer.

8. The camera decoration cover of claim 7, wherein a protruding adhesive layer portion is arranged on an inner edge of the adhesive layer, and the protruding adhesive layer portion protrudes toward the camera hole and is located in the first region.

9. The camera decoration cover of claim 1, wherein the coverage region is a ring extending in a circumferential direction of the decoration cover plate, and the coverage region comprises at least one second region; wherein the second region is provided with at least one second electrostatic discharge hole corresponding to the camera hole; wherein the second region is a region located on one side of the second center adjacent to the first center, and the second region is formed by respectively rotating the straight line where the first center and the second center lie around the second center toward the two sides of the straight line by a second preset angle, and the second preset angle is in a range of (0, 45°].

10. A camera decoration cover, comprising:
a decoration cover plate; and
a light-transmitting cover plate stacked with the decoration cover plate;
wherein a region covered by the light-transmitting cover plate on the decoration cover plate is a coverage region, the coverage region is a ring extending in a circumferential direction of the decoration cover plate, and at least one camera hole is provided in the coverage region; wherein the coverage region comprises at least one second region with at least one second electrostatic discharge hole corresponding to the camera hole; wherein a center of the coverage region is a first center, and a center of the camera hole is a second center; wherein the second region is a region located on one side of the second center adjacent to the first center, and the second region is formed by respectively rotating a straight line where the first center and the second center lie around the second center toward two sides of the straight line by a second preset angle, and the second preset angle is in a range of (0, 45°].

11. The camera decoration cover of claim 10, wherein the second preset angle is in a range of (0, 25°].

12. The camera decoration cover of claim 10, wherein the coverage region comprises a second subregion connected to an inner edge of the coverage region, the second subregion extends in an entire circumferential direction of the coverage region, a distance between an outer edge of the second subregion and the inner edge of the coverage region is in a range of (0, 10 mm], and the at least one second electrostatic discharge hole is located in the second subregion.

13. The camera decoration cover of claim 10, wherein the at least one second electrostatic discharge hole intersects with the straight line.

14. The camera decoration cover of claim 10, wherein the second electrostatic discharge holes are respectively provided on two sides of the straight line.

15. The camera decoration cover of claim 10, wherein the second electrostatic discharge hole is an elongated hole, and the second electrostatic discharge hole extends in a circumferential direction of the coverage region.

16. An electronic device, comprising:
a rear cover having a mounting opening;
a camera decoration cover fixed to the rear cover;
a camera module, located on one side of a decoration cover plate far away from a light-transmitting cover plate; and
a first ground member being independent of the camera module;
wherein the camera decoration cover comprising:
the decoration cover plate; and
the light-transmitting cover plate stacked with the decoration cover plate;
wherein a region covered by the light-transmitting cover plate on the decoration cover plate is a coverage region, and at least one camera hole is provided in the coverage region; wherein the coverage region comprises at least one first region with at least one first electrostatic discharge hole corresponding to the camera hole; wherein a center of the coverage region is a first center, and a center of the camera hole is a second center; wherein the first region is a region located on one side of the second center far away from the first center, and the first region is formed by respectively rotating a straight line where the first center and the second center lie around the first center toward two sides of the straight line by a first preset angle, and the first preset angle is in a range of (0, 45°];
wherein the camera hole is opposite to the mounting opening, and a light-incident surface of the camera module is right opposite to the camera hole.

17. The electronic device of claim 16, wherein the at least one first electrostatic discharge hole is located on an outer side of an orthographic projection of the corresponding camera module in the coverage region.

18. The electronic device of claim 16, wherein the camera decoration cover is covered on the mounting opening, the camera decoration cover is located on one side of the rear cover far away from the camera module, a first via hole is provided on a portion of the rear cover corresponding to the coverage region, an orthographic projection of the first via hole in the coverage region overlaps the first electrostatic discharge hole, and static electricity introduced by the first electrostatic discharge hole is guided to the first ground member through the first via hole.

19. The electronic device of claim 16, wherein the electronic device further comprising a main circuit board and a mainboard bracket; wherein the main circuit board is located on one side of the rear cover adjacent to the camera module and is electrically connected to the camera module; wherein the mainboard bracket is located on one side of the main circuit board adjacent to the rear cover, the mainboard bracket is provided with an avoidance hole right opposite to the camera hole, and the mainboard bracket is covered on the camera module.

20. The electronic device of claim 19, wherein the mainboard bracket is provided with a second via hole spaced apart from the avoidance hole, and static electricity introduced by the first electrostatic discharge hole is guided to the first ground member through the second via hole.

* * * * *